United States Patent
Baba et al.

(10) Patent No.: US 8,065,541 B2
(45) Date of Patent: Nov. 22, 2011

(54) SERVER POWER CONSUMPTION CONTROLLER, AND METHOD AND COMPUTER PROGRAM FOR CONTROLLING SERVER POWER CONSUMPTION

(75) Inventors: Toshiyuki Baba, Yokohama (JP); Yoshifumi Takamoto, Kokubunji (JP); Keisuke Hatasaki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 672 days.

(21) Appl. No.: 12/169,917

(22) Filed: Jul. 9, 2008

(65) Prior Publication Data

US 2009/0187776 A1    Jul. 23, 2009

(30) Foreign Application Priority Data

Jan. 21, 2008  (JP) .................................. 2008-010684

(51) Int. Cl.
*G06F 1/32* (2006.01)

(52) U.S. Cl. .......................... 713/322; 713/300; 713/320
(58) Field of Classification Search .................. 713/300, 713/320, 322, 323, 324
See application file for complete search history.

(56) References Cited

U.S. PATENT DOCUMENTS

| 6,845,456 | B1 | 1/2005 | Menezes et al. |
| 7,080,267 | B2 | 7/2006 | Gary et al. |
| 7,155,617 | B2 | 12/2006 | Gary et al. |
| 2004/0111596 | A1 | 6/2004 | Rawson, III |
| 2005/0060590 | A1* | 3/2005 | Bradley et al. ................ 713/320 |
| 2008/0229127 | A1* | 9/2008 | Felter et al. ................... 713/320 |

FOREIGN PATENT DOCUMENTS

| JP | 2003-256067 A | 9/2003 |
| JP | 2004-192612 A | 7/2004 |

* cited by examiner

*Primary Examiner* — Dennis M Butler
(74) *Attorney, Agent, or Firm* — Mattingly & Malur, PC

(57) ABSTRACT

A power consumption controller controls the power consumption of a physical server having a virtual server. A management server determines an unused CPU budget from the difference between the total amount of the loads of respective virtual servers and a hypervisor and the total CPU budget of the physical server. The management server determines the drive frequency of the CPU inside the physical server based on the unused CPU budget. The management server changes a CPU allocation budget related to the respective virtual servers and the hypervisor in accordance with the determined drive frequency. The hypervisor controls the CPU allocation budget and drive frequency in accordance with an indication from the management server.
Accordingly, the power consumption of the physical server is controlled.

17 Claims, 19 Drawing Sheets

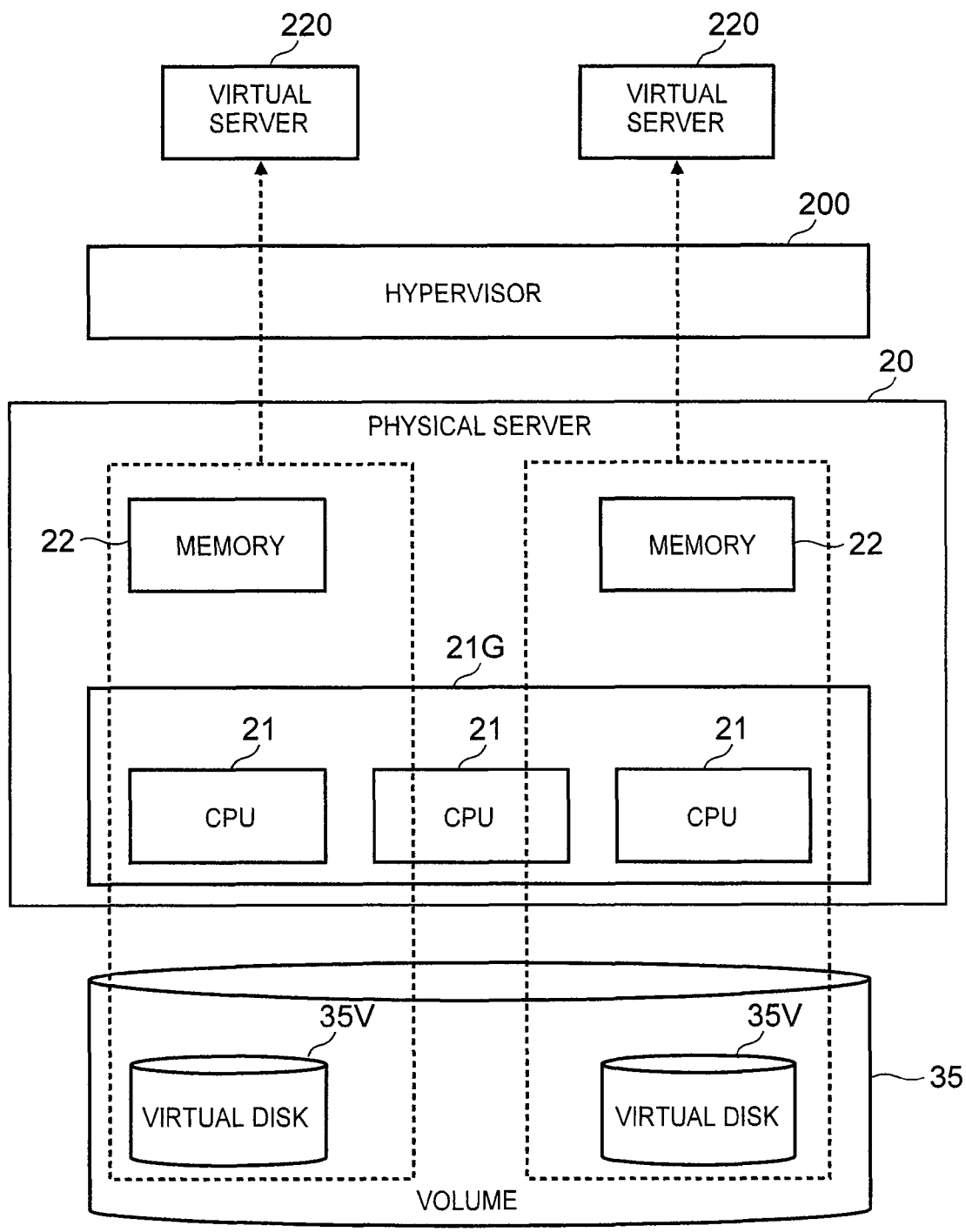

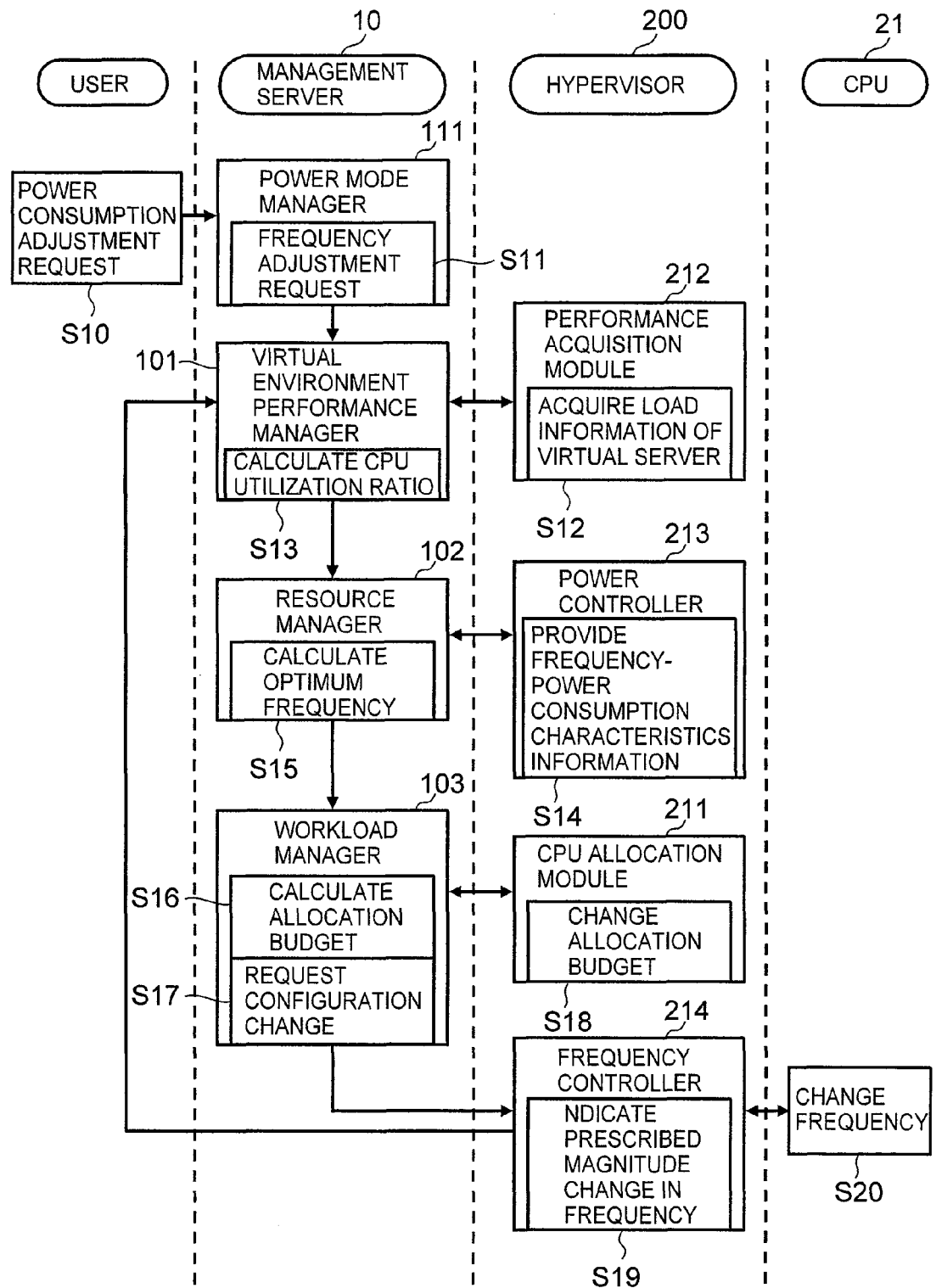

FIG. 7A

PRE-CHANGE 400

| | NORMAL MODE 410 | | POWER-SAVING MODE 420 | |
|---|---|---|---|---|
| | CPU ALLOCATION BUDGET 411 | CPU UTILIZATION RATIO (26% UNUSED) 412 | CPU ALLOCATION BUDGET 421 | CPU UTILIZATION RATIO (0% UNUSED) 422 |
| 220 VIRTUAL SERVER 1 | 60% | 60% | 60% | 44.5% |
| 220 VIRTUAL SERVER 2 | 19% | 6% | 19% | 27% |
| 220 VIRTUAL SERVER 3 | 19% | 6% | 19% | 27% |
| 200 HYPERVISOR | 2% | 2% | 2% | 1.5% |

FIG. 7B

POST-CHANGE 400

| | NORMAL MODE 410 | | POWER-SAVING MODE 420 | |
|---|---|---|---|---|
| | CPU ALLOCATION BUDGET 411 | CPU UTILIZATION RATIO (26% UNUSED) 412 | CPU ALLOCATION BUDGET 421 | CPU UTILIZATION RATIO (0% UNUSED) 422 |
| 220 VIRTUAL SERVER 1 | 60% | 60% | 85% | 85% |
| 220 VIRTUAL SERVER 2 | 19% | 6% | 6% | 6% |
| 220 VIRTUAL SERVER 3 | 19% | 6% | 6% | 6% |
| 200 HYPERVISOR | 2% | 2% | 3% | 3% |

FIG. 8

PHYSICAL SERVER MANAGEMENT TABLE (121)

| PHYSICAL SERVER IDENTIFIER (C1210) | CPU (C1211) | MEMORY (C1212) | DEVICE (C1213) | CONNECTION-DESTINATION DISK (C1214) |
|---|---|---|---|---|
| SERVER 1 | 2GHz × 4 | 24GB | NIC 1: MAC 1<br>NIC 2: MAC 2<br>HBA: WWN 1 | VOLUME 1<br>(300GB) |
| SERVER 2 | 2GHz × 4 | 16GB | NIC 1: MAC 3<br><br>HBA: WWN 2 | VOLUME 2<br>(600GB) |
| SERVER 3 | 3GHz × 4 | 128GB | NIC 1: MAC 4<br>NIC 2: MAC 5<br>HBA 1: WWN 3<br>HBA 2: WWN 4 | VOLUME 3<br>(500GB)<br><br>VOLUME 4<br>(1TB) |
| SERVER 4 | 3GHz × 2 | 64GB | NIC 1: MAC 6<br>NIC 2: MAC 7<br>HBA 1: WWN 5<br>HBA 2: WWN 6 | VOLUME 5<br>(2TB)<br><br>VOLUME 6<br>(1TB) |

FIG. 9

VIRTUAL SERVER MANAGEMENT TABLE (122)

| HYPERVISOR IDENTIFIER (C1220) | PHYSICAL SERVER IDENTIFIER (C1221) | VIRTUAL SERVER IDENTIFIER (C1222) | ALLOCATION RESOURCE (C1223) |
|---|---|---|---|
| HYPERVISOR 1 | PHYSICAL SERVER 1 | VIRTUAL SERVER 1 | CPU GROUP: CPU GROUP 1 (2GHz × 4)<br>MEMORY: 2GB<br>vNIC 1: vMAC 1<br>DISK: VIRTUAL DISK 1 |
| | | VIRTUAL SERVER 2 | CPU GROUP: CPU GROUP 1 (2GHz × 4)<br>MEMORY: 1GB<br>vNIC 1: vMAC 2<br>DISK: VIRTUAL DISK 2 |
| HYPERVISOR 2 | PHYSICAL SERVER 2 | VIRTUAL SERVER 3 | CPU GROUP: CPU GROUP 2 (2GHz × 2)<br>MEMORY: 8GB<br>vNIC 1: vMAC 3<br>DISK: VIRTUAL DISK 3 |
| HYPERVISOR 3 | PHYSICAL SERVER 3 | VIRTUAL SERVER 4 | CPU GROUP: CPU GROUP 3 (3GHz × 1)<br>MEMORY: 4GB<br>vNIC 1: vMAC 4<br>DISK: VIRTUAL DISK 4 |
| | | VIRTUAL SERVER 5 | CPU GROUP: CPU GROUP 4 (3GHz × 1)<br>MEMORY: 2GB<br>vNIC 1: vMAC 5<br>DISK: VIRTUAL DISK 5 |

FIG. 10

WORKLOAD MANAGEMENT TABLE (123)

| HYPERVISOR IDENTIFIER (C1230) | PHYSICAL SERVER IDENTIFIER (C1231) | VIRTUAL SERVER IDENTIFIER (C1232) | CPU ALLOCATION BUDGET (C1233) | PHYSICAL CPU UTILIZATION RATIO (C1234) | NUMBER OF QUEUED VIRTUAL SERVER EXECUTION PROCESSES (C1235) |
|---|---|---|---|---|---|
| HYPERVISOR 1 | PHYSICAL SERVER 1 | VIRTUAL SERVER 1 | 70% | 50% | 0 |
| | | VIRTUAL SERVER 2 | 28% | 40% | |
| | | VIRTUALIZATION SYSTEM 1 | 2% | 2% | |
| HYPERVISOR 2 | PHYSICAL SERVER 2 | VIRTUAL SERVER 3 | 98% | 70% | 5 |
| | | VIRTUALIZATION SYSTEM 2 | 2% | 2% | |
| HYPERVISOR 3 | PHYSICAL SERVER 3 | VIRTUAL SERVER 4 | 50% | 100% | 0 |
| | | VIRTUALIZATION SYSTEM 3 | 2% | 2% | |

| 125 ↘ | | CPU FREQUENCY C1250 | | | | | |
|---|---|---|---|---|---|---|---|
| | | Lv1 | Lv1 | Lv2 | Lv3 | Lv4 | Lv5 |
| | | 1.6 | ~2.2 | ~2.4 | ~2.6 | ~2.8 | ~3.2 |
| POWER CONSUMPTION (W) C1251 | ~8W | 1 | 1 | — | — | — | — |
| | ~10W | — | — | 2 | — | — | — |
| | ~12W | — | — | — | 3 | — | — |
| | ~13W | — | — | — | — | 4 | — |
| | ~14W | — | — | — | — | — | 5 |

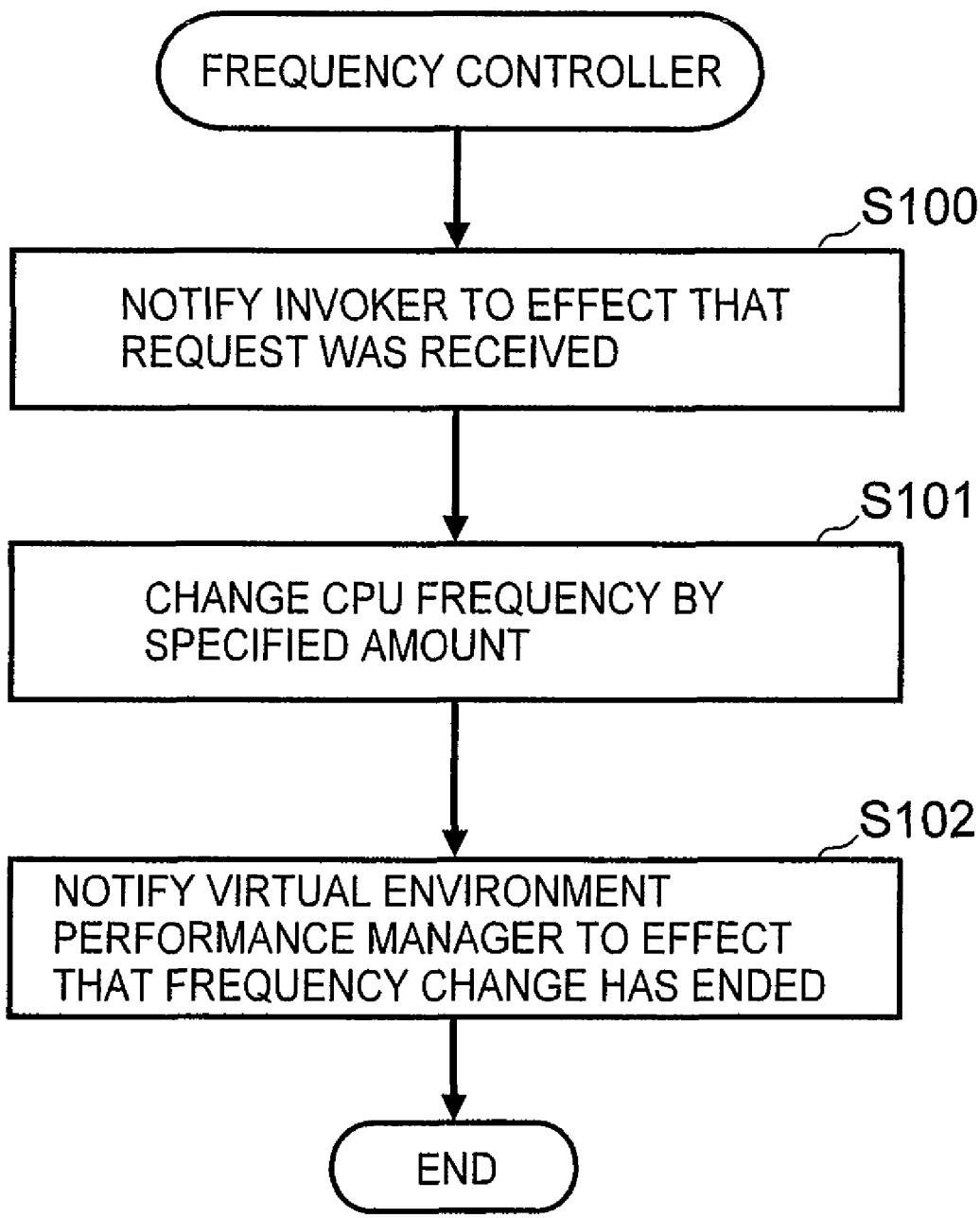

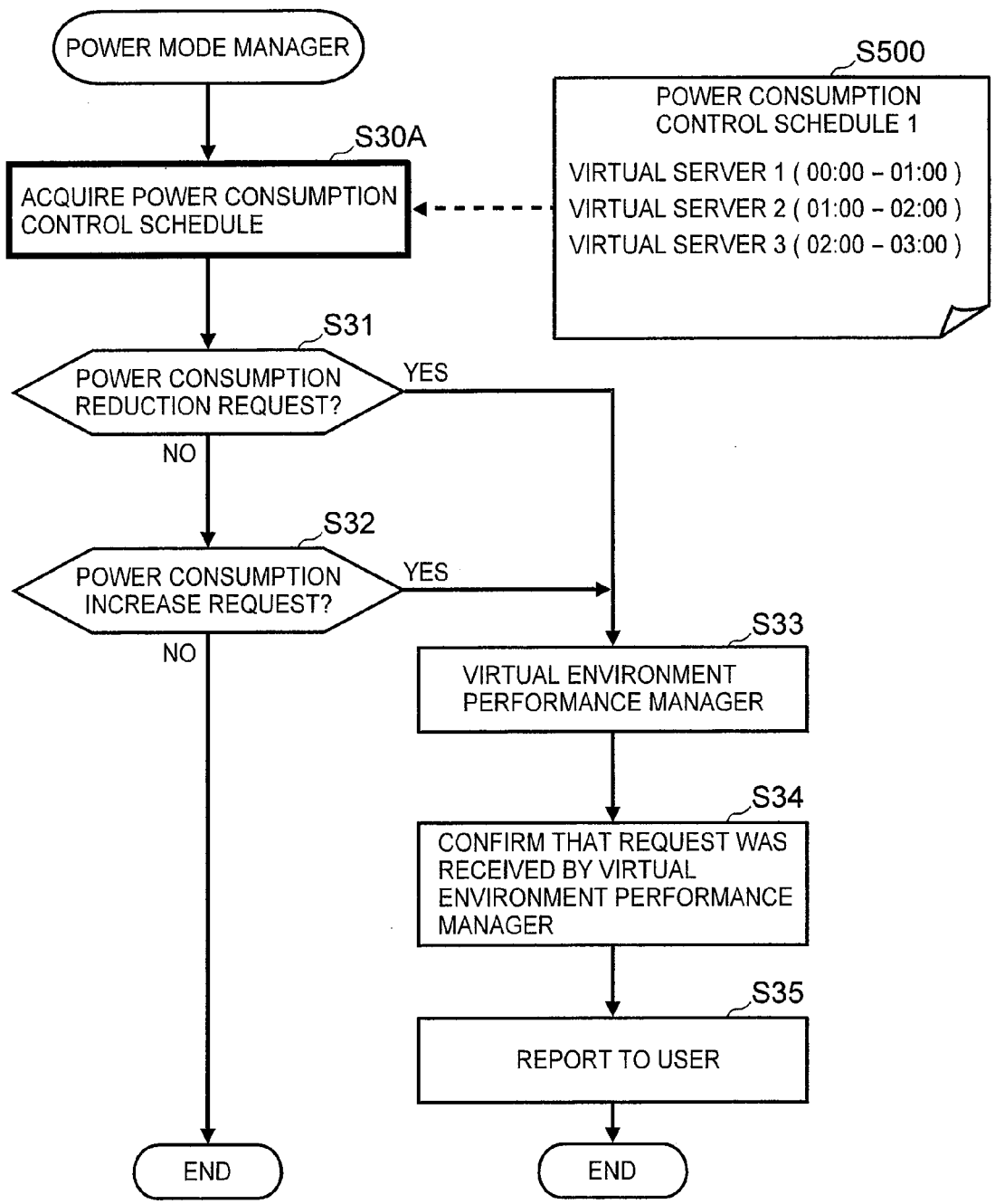

SERVER POWER CONSUMPTION CONTROLLER, AND METHOD AND COMPUTER PROGRAM FOR CONTROLLING SERVER POWER CONSUMPTION

CROSS-REFERENCE TO RELATED APPLICATIONS

This application relates to and claims priority from Japanese Patent Application No. 2008-010684 filed on Jan. 21, 2008, the entire disclosure of which is incorporated herein by reference.

BACKGROUND OF THE INVENTION

1. Field of the Invention

The present invention relates to a server power consumption controller, and a method and computer program for controlling the power consumption of a server.

2. Description of the Related Art

A CPU (Central Processing Unit) mounted in a server computer (hereinafter the server), for example, is used for running an operating system (OS), an application program and so forth. To improve the processing efficiency of the server, the tendency from year to year has been to increase the number of CPUs mounted in the server.

In the meantime, the amount of power consumed by the server has also been increasing year by year. For example, there have been cases in which the total power consumption of the entire information processing system in a data center or other such system having large numbers of servers has increased beyond the allowable power capacity of the facility. Thus, the problem is that not only are electricity costs increasing, but also that the number of installed servers is being restricted.

Of a server's various hardware components, the CPU consumes the most power by far. Therefore, the power consumption of the server will increase in line with increasing the number and operating frequencies of the CPUs mounted in the server.

Further, the practice of integrating a plurality of processor cores into a single CPU, the so-called multiple core CPU, to enhance processing performance by executing a large number of programs in parallel is also progressing. The larger the number of cores inside the CPU, the greater the power consumption of the CPU.

Furthermore, since higher power consumption increases the load on the power source device, the life of the power source device or the like may be shortened.

Accordingly, to reduce the power consumption of the server, technologies for reducing the frequency of the CPU have been proposed (U.S. Pat. Nos. 6,845,456, 7,080,267 and 7,155,617). In these prior arts, power consumption and heat generation are lowered by forcibly reducing the CPU operating frequency and supply voltage when the CPU is idling or under a low load.

Now then, technology for disposing either one or a plurality of virtual servers on top of a single physical server is known. The technology, for example, is called server virtualization technology. The respective virtual servers can independently run their own separate OS. Server virtualization technology proportionally allocates the various types of computer resources of the physical server, such as the processor, memory, and disk device, to each of the virtual servers. Consequently, it is possible to make efficient use of the limited computer resources of the physical server.

A hypervisor running on the physical server is in charge of computer resource allocation and virtual server scheduling. The creation and deletion of a virtual server is implemented by the user (this includes the administrator; the same holds true hereinbelow) issuing an indication to the hypervisor. A virtual server is created by reserving computer resources and allocating these resources to the virtual server. This virtual server is deleted by releasing the computer resources that have been allocated to the virtual server.

The prior art disclosed in the above-mentioned Patent Documents makes it possible to reduce power consumption by lowering the frequency of the CPU. However, the prior art cannot be applied as-is to a physical server having either one or a plurality of virtual servers. That is, under a virtual server environment, simply using the prior art as-is does not make it possible to reduce power consumption without also lowering the functionality of the virtual server.

One problem has to do with the timing at which the frequency is lowered. Under a virtual server environment, a plurality of virtual servers may share a single CPU, and in this case, a plurality of virtual servers can be operated simultaneously using the same CPU.

Therefore, if the operating frequency of the CPU is lowered while one virtual server is in the idle state, the processing performance of the other virtual server sharing the CPU will also be lowered at the same time.

One other problem is the fact that lowering the operating frequency of the CPU also lowers the performance of the hypervisor that manages the virtual server. To make a virtual server environment functional requires a hypervisor for carrying out the dispatch processing and resource allocation processing for operating the respective virtual servers. Therefore, lowering the operating frequency of the CPU being used by the hypervisor not only impacts the virtual servers sharing the CPU, but also affects the operation of the hypervisor, thereby lowering the performance of the virtual servers as a whole.

SUMMARY OF THE INVENTION

Accordingly, an object of the present invention is to provide a server power consumption controller, and a method and computer program for controlling server power consumption, which make it possible to reduce power consumption while curbing degradation of virtual server performance. Another object of the present invention is to provide a server power consumption controller, and a method and computer program for controlling server power consumption that make it possible to control power consumption by tracking virtual server load fluctuations. Yet other objects of the present invention should become clear from the descriptions of the embodiments explained hereinbelow.

A server power consumption controller according to a first aspect of the present invention for solving the above-mentioned problems is a power consumption controller for controlling the power consumption of a physical server having at least one virtual server, wherein the physical server comprises at least one virtual server virtually created by allocating a processing resource of the physical server, and a hypervisor that creates the virtual server by allocating the processing resource to the virtual server, the server power consumption controller comprising: a utilization budget detector that detects the total utilization budget of a first budget of the processing resource utilized by the virtual server and a second budget of the processing resource utilized by the hypervisor, and outputs a determination request for a frequency for driving the processing resource; a frequency determination module that determines, when a determination request is received, the frequency for driving the processing resource based on the difference between the total utilization budget and the total budget of the processing resource; an allocation budget determination module that respectively determines, in accordance with the determined frequency, a third budget of the processing resource to be allocated to the virtual server, and a fourth budget of the processing resource to be allocated to the hypervisor; and a configuration change module that requests the hypervisor to allocate the determined third budget of the processing resource to the virtual server, to allocate the determined fourth budget of the processing resource to the hypervisor, and to drive the processing resource at the determined frequency.

In a second aspect according to the first aspect, the server power consumption controller further comprises a power consumption characteristics acquisition module that acquires beforehand the frequency-power consumption characteristics showing the relationship between the frequency and power consumption related to the processing resource, wherein the frequency determination module determines the frequency for driving the processing resource from within a range of prescribed frequencies configured beforehand on the basis of the frequency-power consumption characteristics.

In a third aspect according to the second aspect, the prescribed frequency range is configured in accordance with a value of a gradient of a characteristic line that shows the power consumption change according to the frequency change.

In a fourth aspect according to the third aspect, thresholds are respectively pre-configured to frequencies at which the values of the gradient of the characteristic line change, and a range of frequencies between the respective thresholds is used as the prescribed frequency range.

In a fifth aspect according to any of the first to the fourth aspects, the utilization budget detector monitors the number of the processing requests, from among the processing requests issued from the virtual server, which are placed in an execution queue in the hypervisor, and when the number of processing requests in the execution queue has reached a pre-configured upper limit, requests the frequency determination module to increment the frequency for driving the processing resource.

In a sixth aspect according to any of the first to the fifth aspects, the third budget is determined as the minimum required processing resource budget for the virtual server under the determined frequency, and the fourth budget is determined as the minimum required processing resource budget for the hypervisor under the determined frequency.

In a seventh aspect according to any of the first to the sixth aspects, the fourth budget is allocated to the hypervisor prior to the third budget allocated to the virtual server.

In an eighth aspect according to the first to the seventh aspects, the utilization budget detector operates in accordance with a prescribed indication.

In a ninth aspect according to the eighth aspect, the prescribed indication is inputted by a user.

In a tenth aspect according to the ninth aspect, a lowest value for the third budget is specified beforehand in the prescribed indication.

In an eleventh aspect according to the ninth aspect, a schedule that shows the time at which the virtual server will execute a process is included beforehand in the prescribed indication, and the utilization budget detector outputs the determination request based on the schedule.

In a twelfth aspect according to any of the first to the eleventh aspects, the utilization budget detector outputs the determination request when a plurality of virtual servers is sharing the processing resource of the physical server.

In a thirteenth aspect according to any of the first to the twelfth aspects, the configuration change module, prior to driving the processing resource at the frequency determined by the frequency determination module, requests the hypervisor to allocate the determined third budget of the processing resource to the virtual server, to allocate the determined fourth budget of the processing resource to the hypervisor, and to subsequently drive the processing resource at the determined frequency.

In a fourteenth aspect according to any of the second to the thirteenth aspects, the hypervisor comprises a processing resource allocation function for allocating the determined third budget of the processing resource to the virtual server, and also allocating the determined fourth budget to the hypervisor in accordance with a request from the configuration change module; a frequency control function for changing the frequency for driving the processing resource; and a power consumption measurement function for acquiring basic data for creating the frequency-power consumption characteristics by using the frequency control function.

A server power consumption control method according to a fifteenth aspect is a power consumption control method for controlling the power consumption of a physical server having at least one virtual server, wherein the physical server comprises at least one virtual server virtually created via the allocation of the processing resource of the physical server, and a hypervisor that creates a virtual server by allocating the processing resource to the virtual server, the server power consumption control method respectively executing: a step of detecting the total utilization budget of a first budget of the processing resource utilized by the virtual server and a second budget of the processing resource utilized by the hypervisor, and outputting a determination request for the frequency for driving the processing resource; a step of determining, when the determination request is received, the frequency for driving the processing resource based on the difference between the total utilization budget and the total budget of the processing resource; a step of respectively determining, in accordance with the determined frequency, a third budget of the processing resource to be allocated to the virtual server, and a fourth budget of the processing resource to be allocated to the hypervisor; a step of requesting the hypervisor to allocate the determined third budget of the processing resource to the virtual server, and to allocate the determined fourth budget of the processing resource to the hypervisor; and a step of requesting the hypervisor to drive the processing resource at the determined frequency.

A server power consumption control method according to a sixteenth aspect is a power consumption control method for controlling the power consumption of a physical server having at least one virtual server, wherein the physical server comprises at least one virtual server virtually created by allocating a processing resource of the physical server, and a hypervisor that creates a virtual server by allocating the processing resource to the virtual server, the server power consumption control method respectively executing: a step of acquiring frequency-power consumption characteristics that show the relationship between the frequency and power consumption related to the processing resource; a step of detecting the total utilization budget of a first budget of the processing resource utilized by the virtual server and a second budget of the processing resource utilized by the hypervisor, and outputting a determination request for the frequency for driving the processing resource; a step of determining, when the determination request is received, the frequency for driving the processing resource based on the difference between the total utilization budget and the total budget of the processing resource within a prescribed frequency range predetermined on the basis of the frequency-power consumption characteristics; a step of respectively determining, in accordance with the determined frequency, a third budget of the processing resource to be allocated to the virtual server, and a fourth budget of the processing resource to be allocated to the hypervisor; a step of requesting the hypervisor to allocate the determined third budget of the processing resource to the virtual server, and to allocate the determined fourth budget of the processing resource to the hypervisor; and a step of requesting the hypervisor to drive the processing resource at the determined frequency.

A computer program according to a seventeenth aspect is a computer program for causing a computer to function as a power consumption controller for controlling the power consumption of a physical server having at least one virtual server, wherein the physical server comprises at least one virtual server virtually created by allocating a processing resource of the physical server, and a hypervisor that creates a virtual server by allocating the processing resource to the virtual server, and the computer program respectively executing: a step of detecting the total utilization budget of a first budget of the processing resource utilized by the virtual server and a second budget of the processing resource utilized by the hypervisor, and outputting a determination request for the frequency for driving the processing resource; a step of determining, when the determination request is received, the frequency for driving the processing resource based on the difference between the total utilization budget and the total budget of the processing resource; a step of respectively determining, in accordance with the determined frequency, a third budget of the processing resource to be allocated to the virtual server, and a fourth budget of the processing resource to be allocated to the hypervisor; a step of requesting the hypervisor to allocate the determined third budget of the processing resource to the virtual server, and to allocate the determined fourth budget of the processing resource to the hypervisor; and a step of requesting the hypervisor to drive the processing resource at the determined frequency.

BRIEF DESCRIPTION OF THE DRAWINGS

FIG. 5 is a schematic diagram showing how to allocate a resource to a virtual server;

FIG. 6 is a schematic diagram showing the flow of this system's overall operations;

FIG. 7 (FIGS. 7A and 7B) shows schematic diagrams respectively showing the states (A) prior to adjusting the optimum drive frequency, and (B) subsequent to adjusting the frequency;

FIG. 8 is a schematic diagram showing the configuration of a physical server management table;

FIG. 9 is a schematic diagram showing the configuration of a virtual server management table;

FIG. 10 is a schematic diagram showing the configuration of a workload management table;

FIG. 18 is a flowchart showing a frequency control process; and

FIG. 19 is a flowchart of a power mode management process related to a second embodiment.

DESCRIPTION OF THE PREFERRED EMBODIMENTS

The embodiments of the present invention will be explained hereinbelow on the basis of the figures. In these embodiments, as will be described in detail hereinbelow, the power consumption of the physical server is controlled by adjusting the CPU allocation budget and CPU drive frequency in accordance with the load of a virtual server. More detailed configurations will be made clear in the embodiment explained hereinbelow.

Figure 1:
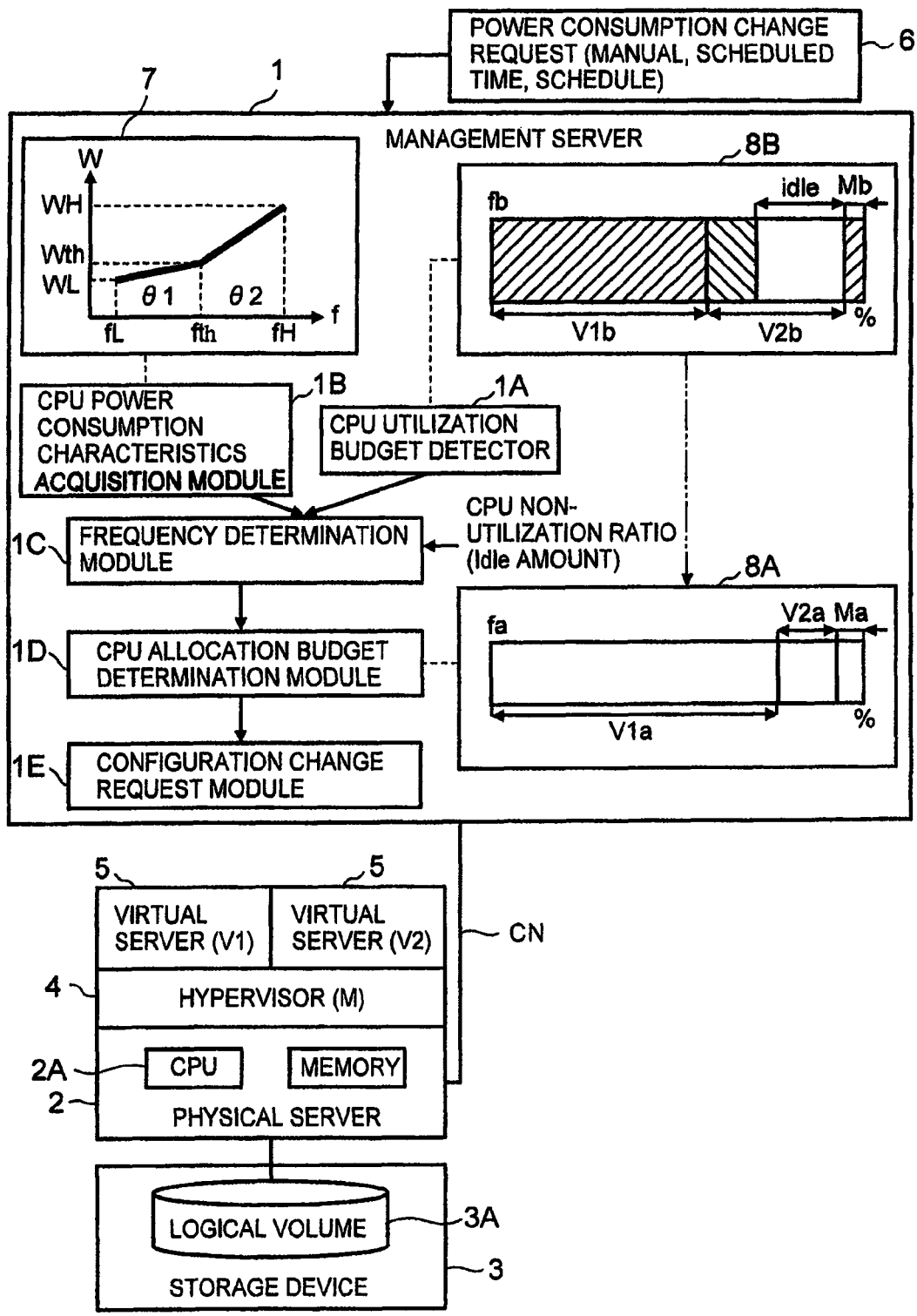
FIG. 1 is a schematic diagram showing the concept of an embodiment of the present invention.

FIG. 1 is a schematic diagram showing the concept of these embodiments. The information processing system shown in FIG. 1, for example, comprises one management server 1, either one or a plurality of physical servers 2, and at least one storage device 3. These will be explained hereinbelow in the order of storage device 3, physical server 2, and management server 1.

The storage device 3, for example, comprises a storage drive, such as a hard disk drive or flash memory device. A logical volume 3A is created using the physical storage area of the storage drive. The storage device 3 is configured as a separate device from the physical server 2, and the physical server 2 and storage device 3 can be connected via a communication network, such as an FC-SAN (Fibre Channel-Storage Area Network) or IP-SAN (Internet Protocol-Storage Area Network). Or the configuration can be such that the storage device 3 is disposed inside the physical server 2. Furthermore, the storage drive comprising the storage device 3 can be of any type.

The physical server 2, for example, comprises various computer resources, such as a CPU (Central Processing Unit) 2A and a memory, a hypervisor 4, and one or a plurality of virtual servers 5. The physical server 2, for example, can be configured in a configuration in which a plurality of computer boards (blades) is mounted to a backboard. That is, the physical server 2 can be configured as a so-called blade server. However, no particular distinction is made as to the specific structure of the physical server 2. A configuration other than a blade server is also applicable to the present invention.

The hypervisor 4 creates a virtual server 5 by allocating the computer resources and the virtual storage area (also called a virtual disk) inside the volume 3A of the physical server 2 to the virtual server 5. The hypervisor 4, for example, is in charge of creating and deleting the respective virtual servers 5, and of the background processing necessary for the operation of the respective virtual servers 5.

The respective virtual servers 5 comprise respectively different OS (Operating Systems). The respective virtual servers 5 can use the respectively allocated computer resources and virtual disks to carry out respectively different processing.

The management server 1 corresponds to the "power consumption controller", and is connected to the physical server 2 via a communication network CN like an IP network. The management server 1 controls the power consumption of the physical server 2 by issuing an indication to the physical server 2 while keeping an eye on the load states and performances of the respective virtual servers 5 and the hypervisor 4.

The management server 1 controls the power consumption of the physical server 2 as described hereinbelow in accordance with a prescribed indication inputted from the user. As will become clear from the embodiments explained hereinbelow, a prescribed indication from the user can be a simple indication to either reduce or increase power consumption, or a power consumption control schedule that takes into account the processing times of the respective virtual servers 5 and the time at which peak load occurs.

The management server 1, for example, comprises a CPU utilization budget detector 1A (hereinafter also called the utilization budget detector 1A), a CPU power consumption characteristics acquisition module 1B (hereinafter also called the power consumption characteristics acquisition module 1B), a frequency determination module 1C, a CPU allocation budget determination module 1D, and a configuration change request module 1E.

The utilization budget detector 1A respectively detects the load states of the respective virtual servers 5 and the hypervisor 4 by carrying out communications with the hypervisor 4. The utilization budget detector 1A corresponds to the "utilization budget detector". Load states can include the utilization ratios of the CPUs of the respective virtual servers 5, the CPU utilization ratio of the hypervisor 4, and the number of queued execution processing requests of the respective virtual servers 5.

As shown in the pre-frequency change CPU utilization status 8B (see also CPU utilization 8A), in this example, the first virtual server 5(V1) uses all of the CPU budget allocated to the first virtual server 5(V1), the second virtual server 5(V2) uses a portion of the CPU budget allocated to the second virtual server 5(V2), and the remaining CPU allocation budget constitutes an unused state (idle). The hypervisor 4 uses all of the CPU budget allocated to the hypervisor 4.

The pre-adjustment CPU utilization ratio (CPU utilization budget) shown in the pre-change status 8B corresponds to either the "first budget" or the "second budget". Furthermore, more than the minimum required CPU budget is constantly allocated to the hypervisor 4.

The CPU budgets allocated to the virtual server 5 and the hypervisor 4 are the times that the virtual server 5 and hypervisor 4 are able to utilize the CPU 2A of the physical server 2. That is, the CPU budget or CPU allocation budget is the amount of time for using the CPU 2A. The larger the CPU allocation budget, the more commands can be executed using the CPU 2A. The larger the drive frequency fb of the CPU 2A, the more commands can be executed within a unit of time.

The number of queued execution processing requests is the parameter used for detecting whether or not the processing performance of the virtual server 5 or hypervisor 4 has dropped. For example, when the processing performance of the virtual server 5 drops due to a shortage of CPU allocation budget, numerous queued execution processing requests accumulate in the hypervisor 4. In this case, more CPU budget is allocated to the virtual server 5 for which processing performance has deteriorated (or to the hypervisor 4).

The power consumption characteristics acquisition module 1B acquires characteristics that show the change in power consumption corresponding to a change in CPU 2A frequency by communicating with the hypervisor 4. The horizontal axis of a characteristics diagram 7 represents the CPU 2A drive frequency (Hz), and the vertical axis represents CPU 2A power consumption (W).

In general, power consumption will increase as the drive frequency becomes larger. However, depending on the structure of the CPU 2A, a frequency change and a power consumption change will not necessarily constitute a simple proportional relationship, the gradient (•) depicting a change in power consumption may change at the boundary of a certain frequency fth.

In the example shown in characteristic diagram 7, when the CPU 2A drive frequency is raised from the lowest frequency fL to the threshold fth, the power consumption of the CPU 2A increases by a first gradient •1. When the CPU 2A drive frequency is raised from the threshold fth to the highest frequency fH, the power consumption of the CPU 2A increases by a second gradient •2 that is larger than the first gradient •1.

In the characteristics diagram 7, WL represents the power consumption when the CPU 2A is being driven at the lowest frequency fL, Wth represents the power consumption when the CPU 2A is being driven at the threshold fth frequency, and WH represents the power consumption when the CPU 2A is being driven at the highest frequency fH.

In the example shown in the characteristics diagram 7, when the CPU 2A drive frequency exceeds the threshold fth, the magnitude of the power consumption change becomes greater. Furthermore, the characteristics diagram 7 is one example that has been provided for understanding the present invention, and does not purport to show that the CPU 2A always comprises characteristics like this. A plurality of thresholds may also be detected when a power consumption change is simply proportional to a frequency change.

When the CPU 2A comprises the frequency-power consumption characteristics shown in the characteristics diagram 7, the reduction effect on the power consumption is meager even when the CPU 2A drive frequency is lowered to the threshold fth or lower. For example, since the current drive frequency is the highest frequency fH, but the CPU utilization ratios of the respective virtual servers 5 are low, this is considered a situation in which the CPU 2A drive frequency can be lowered to the threshold fth or lower.

Simply stated, the CPU 2A drive frequency will be lowered to the lowest possible value. However, in this case, the magnitude of the reduction in the power consumption is less than the magnitude of the decrease in the frequency. This is because the power consumption gradient •1 is small in the frequency domain equal to or lower than the threshold fth.

Meanwhile, the CPU 2A drive frequency must be changed in stages. This is because suddenly changing the CPU 2A drive frequency from the current frequency to a target frequency can result in the operation of the CPU 2A becoming unstable. Therefore, a certain amount of time must be spent gradually changing the CPU 2A drive frequency to the target drive frequency, generating time costs in order to change the frequency.

The load of a virtual server 5 changes from one minute to the next. A virtual server 5 that was in the idle state a moment ago at a certain point in time may suddenly execute a large amount of processing. Therefore, after lowering the CPU 2A drive frequency, there are cases when the load on the virtual server 5 that utilizes the CPU 2A rises, and the CPU utilization ratio increases. In this case, it is necessary to increase the CPU allocation budget to the virtual server 5, or return the CPU 2A drive frequency to its original value (in the example currently being explained, this would be the highest frequency fH), or respectively increase the CPU allocation budget and the drive frequency to match the increase in the load of the virtual server 5.

However, as described hereinabove, it is not desirable to suddenly change the CPU 2A drive frequency to the target drive frequency. Therefore, the CPU 2A drive frequency is changed in stages. Thus, it is not possible to rapidly track a virtual server 5 load increase, and the processing performance of the virtual server 5 deteriorates.

Accordingly, this embodiment is constituted so as to configure the threshold (fth) beforehand based on the frequency-power consumption characteristics, and not lower the CPU 2A drive frequency to the threshold fth or lower. In the above-mentioned example, even when the CPU 2A drive frequency is capable of being lowered to the lowest frequency fL, the CPU 2A drive frequency is only lowered to the threshold fth (fth>fL). Consequently, it is possible to rapidly track the load increase of the virtual server 5 while reducing power consumption.

In other words, in this embodiment, not lowering the CPU 2A drive frequency to the lowest possible value fL, but rather only lowering the drive frequency to the threshold fth prior thereto, leaves a frequency change margin (=fth−fL). In accordance with the margin, it is possible to increase the CPU 2A drive frequency relatively quickly when the load on the virtual server 5 increases.

The frequency determination module 1C determines the CPU 2A drive frequency based on the difference ("idle" in the pre-change status 8B) between total utilization budget of the CPU utilization ratios of the respective virtual servers 5 and the CPU utilization ratio of the hypervisor 4 detected by the utilization budget detector 1A, and the total budget of the CPU 2A. The frequency determination module 1C detects a threshold, which has a value greater than the determined drive frequency, and which is closest to the determined drive frequency, and determines the detected threshold as the CPU 2A drive frequency. In the example mentioned above, the drive frequency calculated based on the non-utilization ratio of the CPU allocation budget is the fL, but the frequency determination module 1C selects the threshold fth closest to the calculated drive frequency fL as the drive frequency.

The CPU allocation budget determination module 1D calculates a new CPU budget to be allocated to the respective virtual servers 5 and the hypervisor 4 based on the drive frequency determined by the frequency determination module 1C. The CPU allocation budget determination module 1D, based on the CPU utilization ratios of the respective virtual servers 5 and the CPU utilization ratio of the hypervisor 4 prior to the frequency change, calculates enough CPU allocation budgets for the respective virtual servers 5 and hypervisor 4 to be able to smoothly execute processing even after a frequency change.

As described hereinabove, the CPU allocation budget is the time during which the CPU 2A can be utilized. The higher the frequency, the larger the number of commands that can be executed within a unit of time. Therefore, the area in which the CPU 2A drive frequency is applied to the CPU allocation budget constitutes the processing resource budget provided either to the virtual server 5 or the hypervisor 4. The larger the area becomes, the more processes are capable of being executed.

Therefore, when lowering the CPU 2A drive frequency, a CPU budget (V1a) that is larger than the current CPU budget (V1b) is allocated to the virtual server 5(V1) that has the large CPU utilization ratio. A CPU budget (V2a) that is smaller than the current CPU budget (V2b) is allocated to the virtual server 5(V2) that has the small CPU utilization ratio. Furthermore, the CPU allocation budget for the hypervisor 4 is also changed from Mb to Ma prior to lowering the CPU drive frequency as shown in CPU Utilization Status 8A.

That is, the CPU allocation budget determination module 1D determines new CPU allocation budgets for the respective virtual servers 5 and the hypervisor 4 that enable the amount of processing executed prior to a frequency change to also be executed subsequent to the frequency change.

The configuration change request module 1E notifies the hypervisor 4 of the determined CPU allocation budget and the determined frequency. The configuration change request module 1E first notifies the hypervisor 4 of the determined CPU allocation budget and changes the CPU allocation budget, and next notifies the hypervisor 4 of the determined frequency and changes the CPU 2A drive frequency.

The hypervisor 4 changes the CPU allocation budgets of the respective virtual servers 5 and the hypervisor 4 in accordance with an indication from the management server 1, and changes the CPU 2A drive frequency. Consequently, it is possible to lower the CPU 2A drive frequency in accordance with the non-utilization ratio of the CPU 2A, and to reduce the power consumption of the CPU 2A.

Even after lowering the drive frequency of the CPU 2A, the utilization budget detector 1A monitors the load states of the respective virtual servers 5 and the hypervisor 4. When the load of a certain virtual server 5(V2) increases and the allocated CPU budget (V2a) seems to be insufficient, the queued execution requests issued from the virtual server 5(V2) accumulate inside the hypervisor 4.

When the number of queued execution processing requests accumulated in the hypervisor 4 reaches a pre-configured prescribed value, the utilization budget detector 1A requests that the frequency determination module 1C re-determine the frequency. The frequency determination module 1C uses the CPU utilization ratios of the respective virtual servers 5, the CPU utilization ratio of the hypervisor 4, and the frequency-power consumption characteristics to determine the drive frequency of the CPU 2A the same as when lowering the drive frequency.

The CPU allocation budget determination module 1D respectively determines the CPU allocation budgets for the respective virtual servers 5 and the CPU allocation budget for the hypervisor 4 such that the respective virtual servers 5 and the hypervisor 4 are able to carry out required processing under the post-change frequency the same as described hereinabove.

The determined frequency and CPU allocation budgets are notified to the hypervisor 4 from the configuration change request module 1E. The hypervisor 4 reconfigures the CPU allocation budget, and changes the drive frequency of the CPU 2A in accordance with an indication from the configuration change request module 1E.

In accordance with configuring this embodiment like this, it is possible to appropriately control the power consumption of the physical server 2 having the respective virtual servers 5 while curbing the deterioration of the processing performance in the respective virtual servers 5. In this embodiment, the drive frequency of the CPU 2A is determined using the frequency (threshold fth) when the value of the gradient, which shows a change in the magnitude of the power consumption, changes, without lowering the CPU 2A drive frequency to the lowest possible frequency.

That is, the drive frequency of the CPU 2A is determined within a prescribed frequency range partitioned by the thresholds (fth). Therefore, it is possible to lower the power consumption of the CPU 2A, and it is possible to raise the drive frequency of the CPU 2A in accordance with an increase in the load on the virtual server 5. This embodiment will be explained in detail hereinbelow.

Embodiment 1

Figure 2:
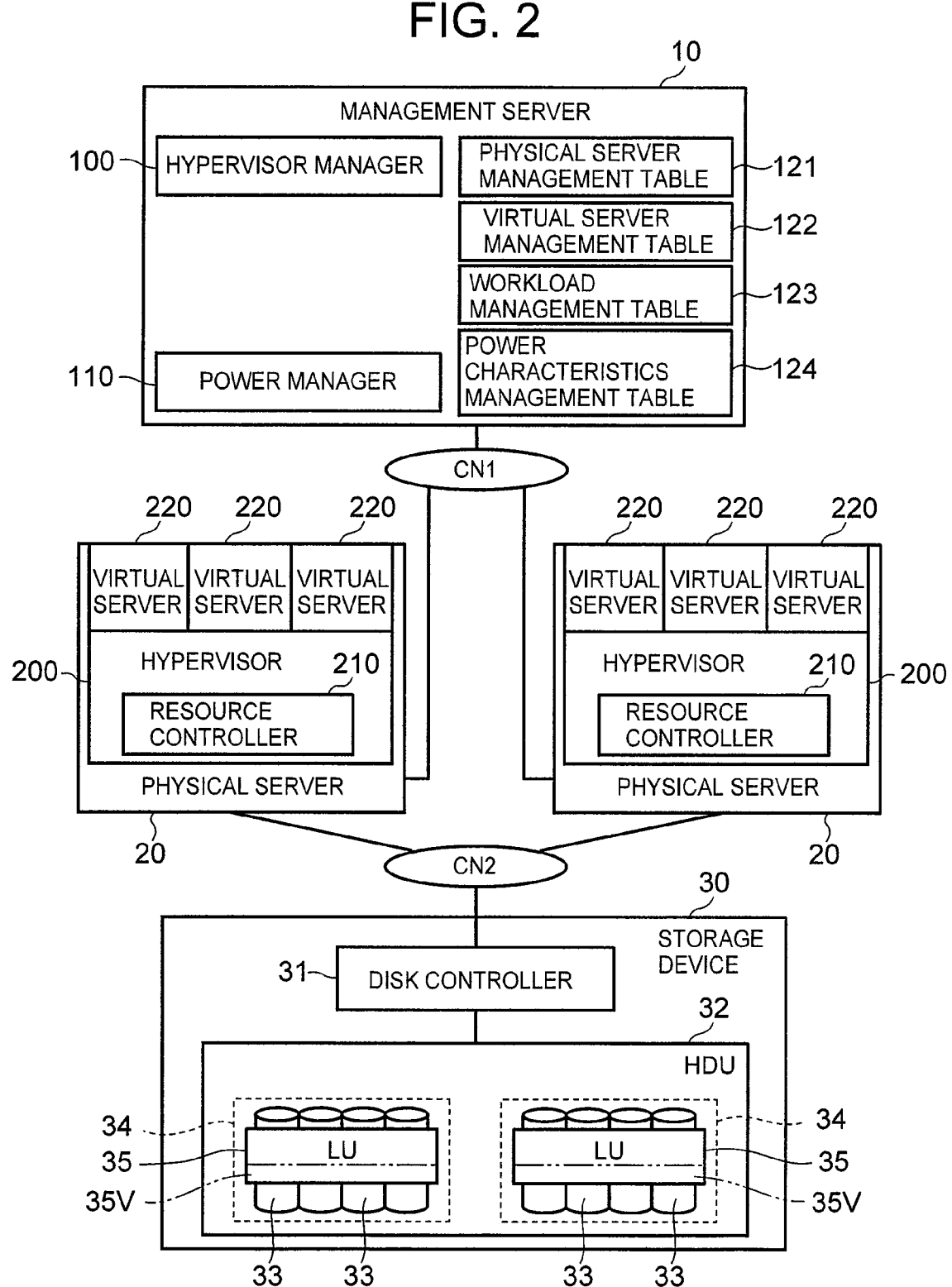
FIG. 2 is a schematic diagram showing the overall configuration of a system related to the embodiment.

FIG. 2 is a schematic diagram showing the overall system configuration of this embodiment. The hypervisor system, for example, comprises a management server 10, either one or a plurality of physical servers 20, and at least one storage device 30.

The corresponding relationship with FIG. 1 will be explained. The management server 10 corresponds to the management server 1 of FIG. 1, and physical server 20 corresponds to the physical server 2 of FIG. 1, and the storage device 30 corresponds to the storage device 3 of FIG. 1. A hypervisor 200 corresponds to the hypervisor 4 of FIG. 1, a virtual server 220 corresponds to the virtual server 5 of FIG. 1, and a logical volume 35 corresponds to the logical volume 3A of FIG. 1. A hypervisor manager 100 corresponds to the utilization budget detector 1A, the frequency determination module 1C, the CPU allocation budget determination module 1D, and the configuration change request module 1E of FIG. 1. A power manager 110 corresponds to the power consumption characteristics acquisition module 1B of FIG. 1. Furthermore, as will be explained hereinbelow, the hypervisor manager 100 comprises a plurality of functions 101 to 103 on the inside thereof, and the respective functions 101 to 103 are in charge of detecting the CPU utilization ratio and number of queued execution requests, determining the frequency, determining the CPU allocation budget, and indicating the change of a frequency and CPU allocation budget.

The management server 10 is the device that carries out power consumption control using this embodiment. The management server 10, for example, comprises the hypervisor manager 100, the power manager 110, and various types of tables 121 to 124. The management server 10 is connected to the respective physical servers 20 by way of a communication network CN1, such as an IP network.

A detailed explanation will be provided hereinbelow, but upon receiving a power consumption adjustment request from the user, the management server 10 measures the load states of the virtual server 220 and the hypervisor 200, and calculates the optimum frequency that will not affect the processing performance of the other virtual server(s) 220. The management server 10 adjusts the CPU allocation budgets for the respective virtual servers 220 and the CPU allocation budget for the hypervisor 200 based on the calculated frequency.

The hypervisor manager 100 has a function that implements the allocation and release of various types of resources, and the adjustment of the frequency in accordance with the acquisition of the load status. The power manager 110 has a function that acquires the frequency-power consumption characteristics of the CPU, and a function that determines whether to configure the power mode to either the normal mode or the power-saving mode.

Information related to the resources of each physical server 20, such as CPU and disk information, is stored in a physical server management table 121. Information on resources allocated to the respective virtual servers 220 is stored in a virtual server management table 122. Information related to the CPU allocation budgets and CPU utilization ratios of the respective virtual servers 220 is stored in a workload management table 123. A power consumption characteristics matrix, which is related to the respective CPUs of the respective physical servers, and which shows the relationship between drive frequency and power consumption, is stored in a power characteristics management table 124.

In this embodiment, the management server 10, subsequent to receiving a power consumption adjustment request from the user, monitors the load states of the virtual server 220 and the hypervisor 200, and changes the CPU allocation budget, and adjusts the drive frequency of the CPU such that the respective processing performances of the virtual server 220 and the hypervisor 200 are not worsened by a CPU frequency change. When lowering the drive frequency of the CPU, it is also possible to lower the CPU drive voltage at the same time. Consequently, this embodiment reduces the power consumption of the CPU.

The physical server 20 is equipped with a hypervisor 200. The hypervisor 200 manages a plurality of virtual servers 220. The hypervisor 200 comprises a resource controller 210 for managing the computer resources of the physical server 20.

The physical server 20 is capable of utilizing the storage device 30. The storage device 30 can be disposed inside the physical server 20, or the respective physical servers 20 and the storage device 30 can be connected via a communication network CN2 that makes use of the fibre channel protocol.

The storage device 30 will be explained first. The storage device 30 comprises a disk controller 31 and a drive mounting module 32. A plurality of storage drives 33, such as, for example, hard disk drives or flash memory devices, are mounted in the drive mounting module 32. A parity group 34 is created by putting either one or a plurality of storage drives 33 into a group. A logical volume (logical unit or LU) 35 is created by using a part of the physical storage area of the parity group 34. Then, a virtual disk area 35V is configured in the logical volume 35. Furthermore, the configuration can also be such that either one or a plurality of logical volumes 35 is provided in a single storage drive 33.

The resource controller 210 of the hypervisor 200 has a function for controlling resource allocation and the drive frequency in accordance with a request from the hypervisor manager 100.

Figure 3:
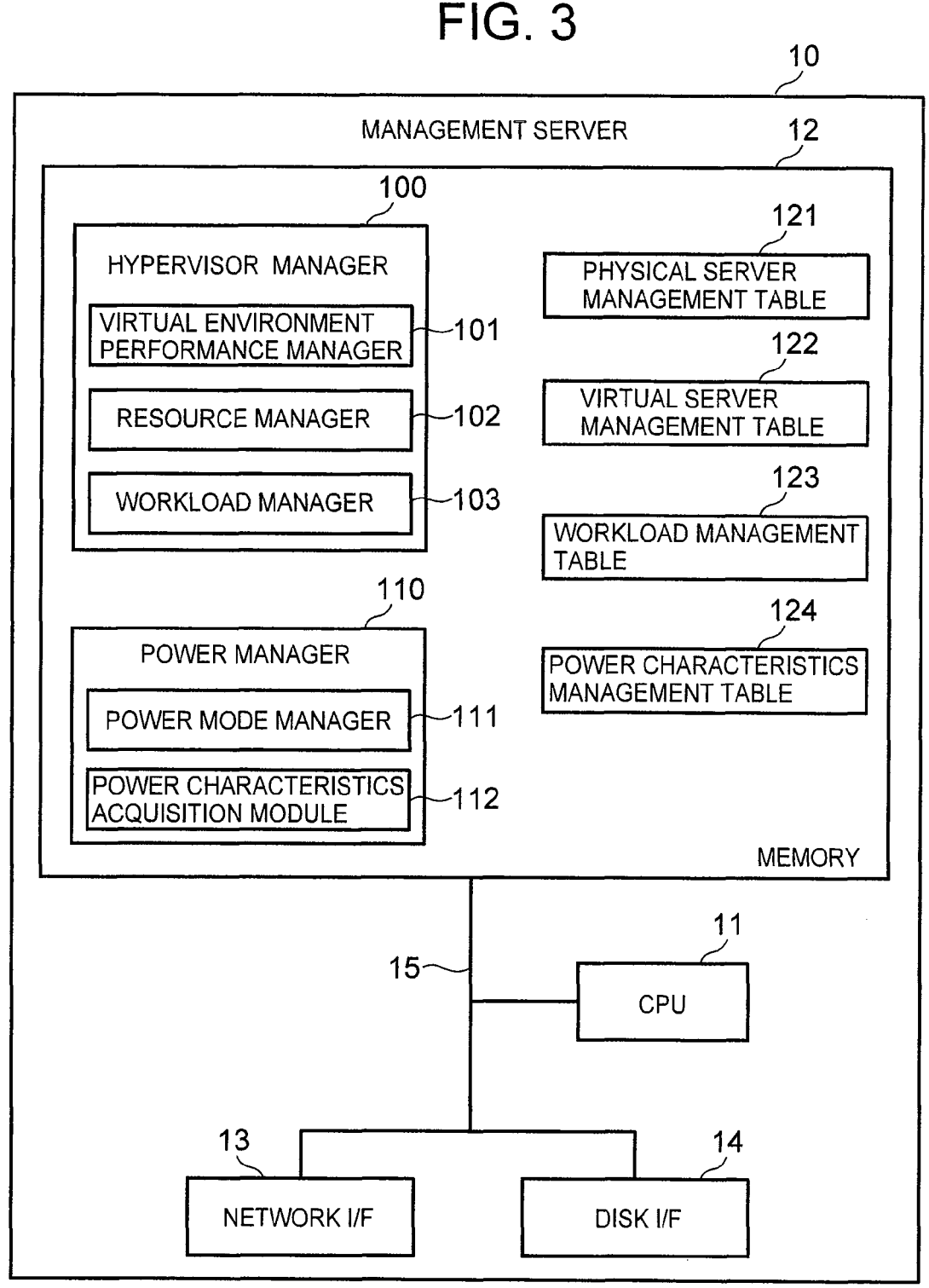
FIG. 3 is a schematic diagram showing the configuration of a management server.

FIG. 3 is a schematic diagram showing an example of the configuration of the management server 10. The management server 10, for example, is configured by interconnecting a memory 12, CPU 11, network interface 13, and disk interface 14 via a bus 15.

Furthermore, although omitted from the figure, the management server 10 comprises a user interface for exchanging information with the user. The user interface comprises an input device for the user to input information, and an output device for providing information to the user. The input device, for example, can be a keyboard switch, pointing device, microphone, or touch panel. The output device, for example, can be a display device, speaker, or printer. The user can request, via the user interface, that the management server 10 adjust the power consumption.

The memory 12 stores the hypervisor manager 100, power manager 110, physical server management table 121, virtual server management table 122, workload management table 123, and power characteristics management table 124.

The hypervisor manager 100, for example, comprises a virtual environment performance manager 101, resource manager 102, and workload manager 103. The power manager 110, for example, comprises a power mode manager 111, and power characteristics acquisition module 112.

The CPU 11 realizes respective functions, such as resource management, resource allocation management, server performance monitoring, frequency-power consumption characteristics acquisition, and CPU frequency adjustment by executing as needed various types of programs related to the virtual environment performance manager 101, resource manager 102, workload manager 103, power mode manager 111, and power characteristics acquisition module 112 stored in the memory 12.

The network interface 13 is connected to the respective physical servers 20 via a network CN1. The network interface 13 is used to send a configuration change request from the management server 10 to the respective physical servers 20. Further, the network interface 13 is used to send information related to frequency-power consumption characteristics from the respective physical servers 20 to the management server 10. The disk interface 14 is the interface that is used to utilize either the storage device 30 or a different storage device outside of the figure.

Furthermore, the respective processing, such as resource management, resource allocation management, server performance monitoring, frequency-power consumption characteristics acquisition, and frequency adjustment are realized by the CPU 11 executing a prescribed program related to each process. However, this embodiment is not limited to this, and, for example, the configuration can be such that either all or a portion of the virtual environment performance manager 101, resource manager 102, workload manager 103 is realized by electronic circuitry.

Figure 4:
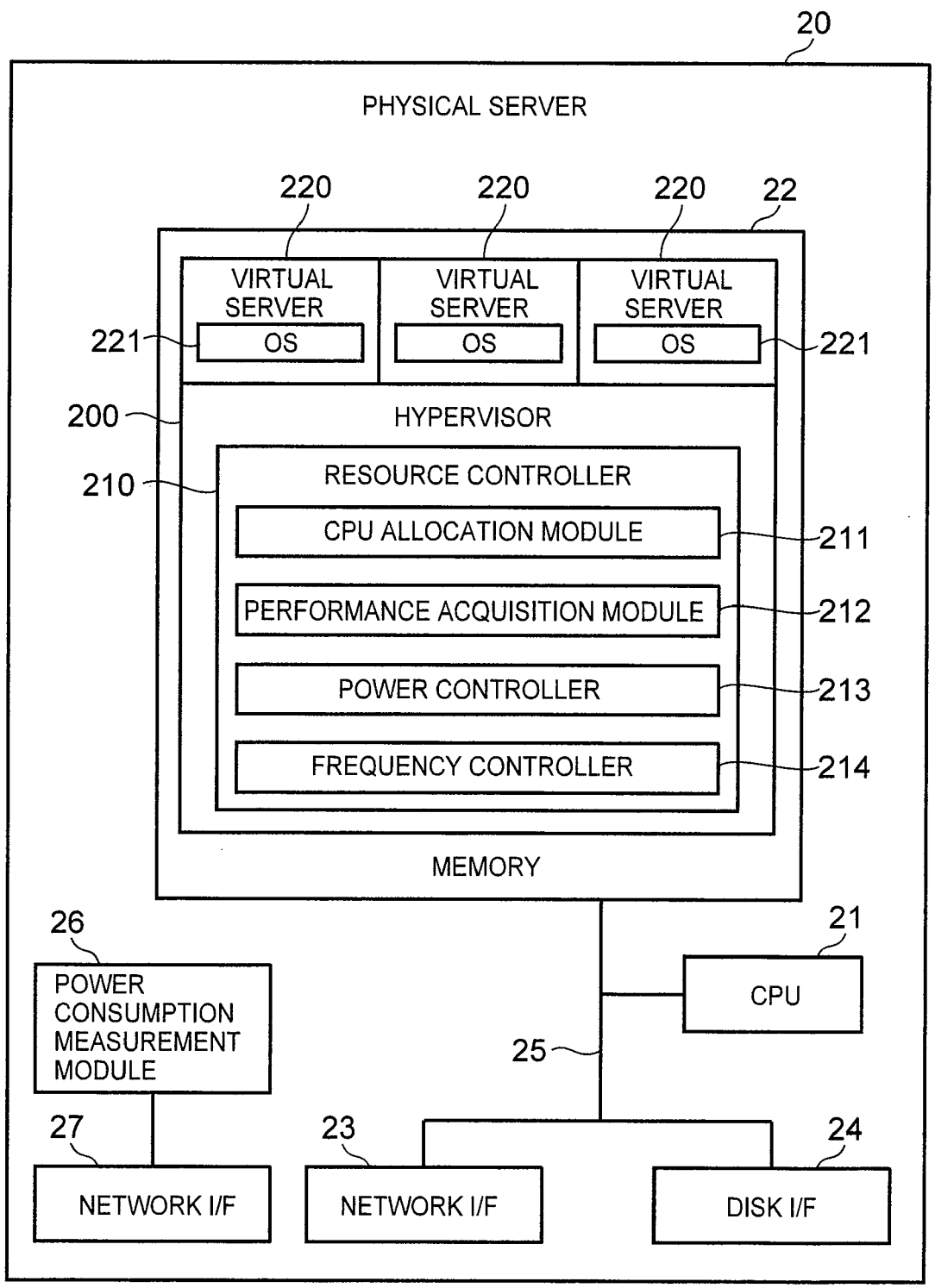
FIG. 4 is a schematic diagram showing the configuration of a physical server.

FIG. 4 is a schematic diagram showing an example of the configuration of the physical server 20. The respective physical servers 20, for example, are respectively configured by interconnecting a CPU 21, memory 22, network interface 23, and disk interface 24 via a bus 25. Furthermore, the respective physical servers 20 comprise a power consumption measurement module 26 for measuring power consumption, and a network interface 27 for sending the result of the measurement to the management server 10. Furthermore, there can be a plurality of CPUs 21, or the CPU 21 can be a multi-core CPU having a plurality of processor cores inside the CPU 21.

Either one or a plurality of virtual servers 220 and a hypervisor 200 are stored inside the memory 22. The hypervisor 200 comprises a resource controller 210. The resource controller 210, for example, comprises a CPU allocation module 211, performance acquisition module 212, power controller 213, and frequency controller 214. The hypervisor 200 executes a process that divides up and allocates the memory 22, CPU 21 and other such resources to the virtual server 220, and a process that controls the execution schedule of the respective virtual servers 220.

Respective processing, such as a process for allocating resources to the virtual server 220, a process for acquiring virtual server load information, and a process for controlling the CPU frequency are executed by the CPU 11 executing as needed respective prescribed programs related to the CPU allocation module 211, performance acquisition module 212, power controller 213, and frequency controller 214. Furthermore, the configuration can be such that either all or a portion of the respective functions 210 to 214 of the hypervisor 200 are realized via hardware circuits.

Respectively different OS 221 are installed in the respective virtual servers 220. The OS 221 are able to operate independently for each virtual server 220.

The configuration of the resource controller 210 will be explained. When lowering the drive frequency of the CPU 21, the CPU allocation module 211 changes the workload (CPU allocation budget) for the respective virtual servers 220 in accordance with the load information of the respective virtual servers 220 and the drive frequency of the CPU 21. The performance acquisition module 212 acquires the respective load information (CPU utilization ratio) of the virtual server 220 and the hypervisor 200.

The power controller 213 acquires information related to frequency-power consumption characteristics related to the CPU 21 via at least either one of the timing prior to the CPU 21 drive frequency being changed, or the timing at which the hypervisor 200 operates. The power controller 213 respectively measures power consumption while stagedly changing the CPU 21 drive frequency, and selects the power consumption that corresponds to the CPU drive frequency.

The frequency controller 214 changes the drive frequency of the CPU 21 using both the timing for carrying out power consumption adjustment (timing for changing the drive frequency of the CPU 21) and the timing for acquiring information related to frequency-power consumption characteristics.

The power consumption measurement module 26 measures the power consumption of the physical server 20, and sends the result of the measurement to the management server 10 via the network interface 27. For example, it is possible to measure the power consumption of the physical server 20 by disposing a resistor in series on the power line for supplying power to the CPU 21, and using a sensor to detect the drop in voltage resulting from the resistor. The measured power consumption is sent to the management server 10 as a digital signal. Furthermore, the method for measuring the power consumption is not limited to the example described hereinabove. For example, there is also a method that uses an infrared temperature sensor to measure the surface temperature of the CPU 21. The power consumption can be estimated from the surface temperature of the CPU 21 using an established characteristics diagram that shows the relationship between surface temperature and power consumption.

FIG. 5 is a diagram schematically showing how to allocate various types of resources to the respective virtual servers 220. The hypervisor 200, for example, allocates the memory 22 and CPU group 21G inside the physical server 20, and the virtual disk 35V disposed inside the logical volume 35 to the respective virtual servers 220.

The allocation of memory 22 to the virtual server 220 signifies that a portion of the memory inside the physical server 20 managed by the hypervisor 200 is allocated as a dedicated memory area to each of the virtual servers 220. A virtual server 220 can only access the memory area that has been allocated to itself, and is not able to access the memory area that has been allocated to the other virtual server 220.

The CPU group 21G is the grouping of the either one or a plurality of CPUs 21 that belong to the physical server 20. Either one or a plurality of CPU groups 21G can be provided, and the respective CPU groups 21G each comprise at least one CPU 21.

The allocation of a CPU group 21G to the virtual server 220 signifies scheduling the utilization time such that the virtual server 220 can utilize the CPU group 21G for a prescribed time only.

There are several methods for allocating a CPU group 21G to the virtual server 220, and, for example, a method by which a CPU group 21G is shared by a plurality of virtual servers 220 can be considered. The number of CPUs 21 inside the CPU group 21G can be arbitrarily configured by the administrator when the virtual server 220 is created.

When there is a plurality of CPU groups 21G, the configuration can be such that the respective virtual servers 220 each take possession of a dedicated CPU group 21G. For example, in a case in which a configuration in which the respective virtual servers 220 each possess a specific CPU group 21G coexists with a configuration in which the respective virtual servers 220 share either one or a plurality of CPU groups 21G, the hypervisor 200 manages information for distinguishing between a virtual server 220 that makes shared use of the CPU and a virtual server 220 that makes exclusive use of a CPU. Furthermore, when the virtual server 220 is making exclusive use of the CPU 21, it is also possible to use a function for changing the drive frequency of each core to adjust the power consumption by lowering the drive frequency of a specified CPU 21 only.

The allocation of a virtual disk 35V to the virtual server 220 signifies allocating a portion of the area of the logical volume 35 as the dedicated area 35V of the virtual server 220. Therefore, the virtual disk 35V is a partial area of the logical volume 35. The OS 221 running on the virtual server 220 recognizes the virtual disk 35V as an ordinary disk. However, in reality, the respective virtual servers 220 are only using a portion of the area of the logical volume 35.

FIG. 6 is a schematic diagram showing an overview of the operations carried out by this embodiment. The user indicates a power consumption adjustment request to the power mode manager 111 (S10). The power consumption adjustment request is a request to adjust power consumption to the optimal level in accordance with the load states of the respective virtual servers 220 and the hypervisor 200.

The power mode manager 111, which receives the request from the user, issues a frequency adjustment request to the virtual environment performance manager 101 (S11). A frequency adjustment request is a request for adjusting the drive frequency of the CPU 21.

The performance acquisition module 212 inside the hypervisor 200 regularly collects the load information (CPU utilization ratios) of the respective virtual servers 220 and the hypervisor 200 (S12). The virtual environment performance manager 101 acquires the load information of the respective virtual servers 220 and the hypervisor 200 from the performance acquisition module 212. The virtual environment performance manager 101 calculates the total utilization budget, which totals the CPU utilization ratios of the respective virtual servers 220 and the CPU utilization ratio of the hypervisor 200 (S13).

In this embodiment, the utilization budget of the entire CPU 21 (CPU groups 21G) is calculated by acquiring the load information of the hypervisor 200 as well as the load information of the respective virtual servers 220. Consequently, even when the drive frequency of the CPU 21 has been lowered, it is possible to curb the adverse affects on processing for operating the virtual server 220 by the hypervisor 200.

When reducing power consumption, processing switches from the virtual environment performance manager 101 to the resource manager 102. The power controller 213 inside the hypervisor 200 provides the resource manager 102 with information related to the frequency-power consumption characteristics of the CPU 21 (S14).

The resource manager 102, based on the total utilization budget delivered from the virtual environment performance manager 101 and the information related to frequency-power consumption characteristics inputted from the power controller 213, calculates the optimum drive frequency in accordance with the current load states of the respective virtual servers 220 and the hypervisor 200 (S15).

The workload manager 103 calculates new CPU allocation budgets for the respective virtual servers 220 based on the frequency calculated by the resource manager 102 (S16). Furthermore, the workload manager 103 issues an indication to the CPU allocation module 211 inside the hypervisor 200 to change to the calculated CPU allocation budget, and next, issues an indication to the frequency controller 214 inside the hypervisor 200 to change the drive frequency of the CPU 21 (S17).

The CPU allocation module 211 changes the CPU allocation budgets of the respective virtual servers 220 and the hypervisor 200 in accordance with the CPU allocation budget indicated from the workload manager 103 (S18). The frequency controller 214 outputs the frequency change indication to the CPU 21 in accordance with the drive frequency indicated from the workload manager 103 (S19). The CPU 21 changes the drive frequency in accordance with the indication from the frequency controller 214 (S20).

By carrying out an operation like this, this embodiment is able to reduce power consumption without affecting the processing performance of the high-load virtual server 220.

Furthermore, for example, the user may be aware of the peak load time of the virtual server 220 beforehand, or may know the load generation period of a specific virtual server 220 beforehand. In these situations, it is possible to control power consumption at the optimum timing by creating beforehand a schedule that regulates the timing and so forth for adjusting the power consumption, and inputting the schedule to the power mode manager 111. An example of this will be explained hereinbelow using a different embodiment.

Specifying the timing for reducing power consumption beforehand makes it possible to level the load of the respective virtual servers 220. Therefore, it is possible to extend the power consumption reduction period by lowering the drive frequency of the CPU 21.

Power consumption can be controlled by taking into account the passage of time by knowing beforehand the frequency-power consumption characteristics of the CPU 21, and determining the integral value between the power consumption capacity of the CPU 21 and the execution time of the virtual server 220. Consequently, it is possible to further optimize the power consumption.

For example, according to the frequency-power consumption characteristics of the CPU 21, finishing processing in a short period of time under a high load state could result in less power being consumed than carrying out processing for a long period of time under a medium load state.

Further, it is also possible to achieve even greater power consumption reduction effects by prioritizing the virtual servers 220 beforehand, only guaranteeing the performance of a specified virtual server 220, and not taking the performance of the other virtual server 220 into account.

When an operation prioritizes the amount of the reduction in power consumption over the drop in performance of the virtual server 220, the drive frequency of the CPU 21 can be significantly lowered by intentionally lowering the performance of the low-priority virtual server 220.

For example, a relatively high priority is configured for a virtual server 220 that executes processing for which a high-speed response is required and a virtual server 220 that executes processing for which the end-time has been decided, and a relatively low priority is configured for a virtual server 220 that is in charge of other processing. As a result of this, it is possible to further reduce the power consumption of the physical server 20.

The virtual environment performance manager 101 once again acquires the load information of the respective virtual servers 220 and the hypervisor 200 from the performance acquisition module 212 subsequent to drive frequency adjustment. When the number of queued execution requests exceeds a prescribed value, the virtual environment performance manager 101 requests that the resource manager 102 readjust the drive frequency. Consequently, even when the load of the virtual server 220 suddenly rises, it is possible to restore the drive frequency of the CPU 21 and/or the CPU allocation budget to their original states relatively quickly.

The power controller 213 of this embodiment acquires and registers information on the relationship between the drive frequency and power consumption of the CPU 21. This information is respectively held in each of the physical servers. In general, changing the drive frequency of the CPU incurs a time cost. This is because changing the CPU drive frequency requires that the drive frequency and the voltage be changed in stages. Therefore, a certain amount of time is needed to restore a drive frequency that has been lowered once to the original drive frequency.

When the load on the virtual server 220 changes intermittently, there is also an increase in the number of times that the drive frequency of the CPU 21 changes. Therefore, there is the risk that the costs required for the respective changes will become conspicuous, and that the performance of the physical server 20 will deteriorate. Accordingly, in this embodiment, the drive frequency of the CPU 21 is determined taking into account the restoration of the drive frequency to its original value or to a value approximating its original value. This will be explained in detail further below.

FIG. 7 is a table 400 showing the state prior to the application of this embodiment (FIG. 7A) and the state subsequent to the application of this embodiment (FIG. 7B). The table 400 is for explaining the effects resulting from this embodiment, and is not used for actual control. Table 400 shows the states of a normal mode 410 and a power-saving mode 420 for each of the respective virtual servers 220 and the hypervisor 200.

The normal mode 410 uses the physical server 20 without lowering the drive frequency of the CPU 21. The power-saving mode 420 uses the physical server 20 by lowering the drive frequency and voltage of the CPU 21.

In the normal mode 410, the CPU allocation budgets shown in column 411 are allocated beforehand to the respective virtual servers 220 and the hypervisor 200. The percentages of these CPU allocation budgets that are actually used are shown in column 412 as CPU utilization ratios. In the case of the power-saving mode 420 as well, the CPU allocation budgets are shown in column 421 and the CPU utilization ratios are shown in column 422, similar to the description for the normal mode 410.

Focusing on the normal mode 410 of FIG. 7A, despite the fact that CPU budgets of 19% each are allocated to the second virtual server and the third virtual server, the actual CPU utilization ratios are just 6% each. That is, 26% of the total budget of the CPU 21 is not being used. By contrast, the CPU allocation budget of the first virtual server is 60%, and the first virtual server is using all of the allocated CPU budget (CPU utilization ratio of 60%).

Accordingly, a power consumption reduction process will be carried out by this embodiment. Since the unused CPU utilization ratio is 26% (=100−(60+6+6+2)) as mentioned above, overall processing performance will probably change little even if the drive frequency of the CPU 21 is lowered to approximately 70%.

Therefore, the drive frequency of the CPU 21 can be lowered to 70%. However, simply lowering the drive frequency of the CPU 21 alone will also lower the performances of the respective virtual servers 220 and the hypervisor 200. Accordingly, in this embodiment, the performance of the first virtual server, and the performances of the second and third virtual servers can be maintained by increasing the CPU allocation budget of the first virtual server to 85% (=60%÷70/100). Further, the overall performance of the server virtualization environment is maintained by changing the CPU allocation budget taking into account the load on the hypervisor 200 at this time as well.

As described hereinabove, in this embodiment, the CPU allocation budgets for the respective virtual servers 220 and the hypervisor 200 are changed in conjunction with lowering the drive frequency as shown in the power-saving mode 420 of FIG. 7B. The CPU allocation budget of the first virtual server is configured at a value (85%) that is larger than the pre-change value (60%). The CPU allocation budgets of the second virtual server and the third virtual server are configured at values (6%) that are smaller than the pre-change values (19%). The CPU allocation budget of the hypervisor 200 is configured at a value (3%) that is larger than the pre-change value (2%) so as to be able to compensate for the lowering of the drive frequency of the CPU 21.

Prior to changing the drive frequency of the CPU 21, the CPU allocation budgets of the respective virtual servers 220 and the hypervisor 200 are changed. The CPU allocation budget of a high-load virtual server 220 is increased, and the CPU allocation budget of a low-load virtual server 220 is decreased. Consequently, it is possible to reduce the power consumption of the physical server 20 while maintaining the performance of all the virtual servers 220 managed by the hypervisor 200.

FIG. 8 is a schematic diagram showing an example of the configuration of the physical server management table 121. Column C1210 shows the physical server identifiers for identifying the respective physical servers 20. Column C1211 stores the specifications of the CPU 21. Column C1212 stores the capacity of the memory 22 mounted in the physical server 20. Column C1213 stores information related to the device connected to the physical server 20.

The devices, for example, can include a NIC (Network Interface Card) and HBA (Host Bus Adapter). In the case of an NIC, a MAC (Media Access Control) address is stored in column C1213. For an HBA, a WWN (World Wide Name) is stored.

The connection destination disk column C1214 stores information related to the logical volume 35 used by the physical server 20. For example, a volume identifier for identifying the logical volume 35, and the volume capacity are stored in column C1214. Furthermore, a plurality of servers 20 can share the same logical volume 35. In this case, the same volume identifier is configured for the different physical servers 20.

FIG. 9 is a schematic diagram showing an example of the configuration of the virtual server 220 management table 122. Column C1220 stores the hypervisor identifier for identifying the hypervisor 200. Ordinarily, one physical server 20 comprises one hypervisor 200. Column C1221 stores a physical server identifier for identifying the physical server 20 on which the hypervisor 200 is running.

Column C1222 stores a virtual server identifier for identifying the virtual server 220. The virtual server identifier can be a unique value inside the hypervisor 200, or the virtual server identifier can be a unique value delivered to a plurality of hypervisors 200. Virtual server identifiers are only registered for the number of virtual servers 220 created by the hypervisor 200.

Column C1223 stores information related to resources allocated to the respective virtual servers 220. For example, this is information showing which CPU is being allocated, the capacity of the allocated memory, information on the vNIC to be used, and the identifier of the virtual disk to be used. The information related to the allocation of the CPU, for example, comprises the CPU group identifier, and a value that distinguishes whether the CPU is being used exclusively or shared.

FIG. 10 is a schematic diagram showing an example of the configuration of the workload management table 123. Column C1230 stores the hypervisor identifier for identifying the hypervisor 200. Column C1231 stores the physical server identifier for identifying the physical server on which the hypervisor 200 is running. When a plurality of hypervisors 200 are running on a single physical server 20, a plurality of hypervisor identifiers are stored in column C1230.

Column C1232 stores a virtual server identifier for specifying the virtual server 220 created by the hypervisor 200 specified in C1230. Furthermore, column C1232 can store the virtual server identifiers of all the virtual servers 220 created by the same hypervisor 200, or column C1232 can store only the identifier of the virtual server 220 of the workload control target (the target of a CPU allocation budget change).

Further, column C1232 also stores the hypervisor identifier for identifying the hypervisor 200 and also stores a virtualization system identifier for specifying a virtualization system created by the hypervisor 200 specified in C1230. In this embodiment, the hypervisor identifier, which manages the overhead of the hypervisor 200, is also managed.

Column C1233 stores the CPU allocation budget related to the virtual server 220. The CPU allocation budget is the time budget of the CPU group 21G, which is allocated to the virtual server 220. The larger the CPU allocation budget, the better the processing performance of the virtual server 220.

Furthermore, the CPU allocation budget unit can be arbitrarily specified by the user. For example, the entire CPU budget for each hypervisor 200 can be treated as 100%, and a percentage value can be stored for each virtual server 220. There is no need to allocate all of the CPU budget (time that the CPU can be used) under the management of the hypervisor 200 to the respective virtual servers 220 without having any left over. The configuration can also be such that an unused CPU budget is left behind beforehand in preparation for a sudden load increase of the virtual server 220.

Column C1234 stores the physical CPU utilization ratio. The physical CPU utilization ratio is the utilization ratio in a case when the entire processing budget of the CPU group 21G is treated as 100%. The physical CPU utilization ratio can be calculated based on the times that the hypervisor 200 scheduled the CPU utilization ratios of the respective virtual servers 220. Or, the physical CPU utilization ratio can be calculated for the virtual server 220 by selecting the CPU utilization ratio of the virtual server 220, and multiplying the CPU utilization ratio by the CPU allocation budget of C1233. The load of the physical server 20 can be discerned by the physical CPU utilization ratio of C1234. Furthermore, the physical CPU utilization ratio can be abbreviated as the "CPU utilization ratio" for the sake of convenience.

In this embodiment, the CPU group 21G is allocated to the hypervisor 200 prior to being allocated to the virtual server 220 to allow the hypervisor 200 to execute the processing needed for operating the virtual server 220.

In this embodiment, the user does not need to clearly specify the CPU allocation budget for the hypervisor 200. The management server 10 can automatically configure a CPU allocation budget of more than the minimum required in the hypervisor 200. Furthermore, the CPU utilization ratio of the hypervisor 200, for example, can be calculated based on the dispatch ratios of the respective virtual servers 220 operated by the hypervisor 200, the number of I/O (Input/Output) requests of the respective virtual servers 220, and the number of queued execution processes of the virtual server 220.

Figure 11:
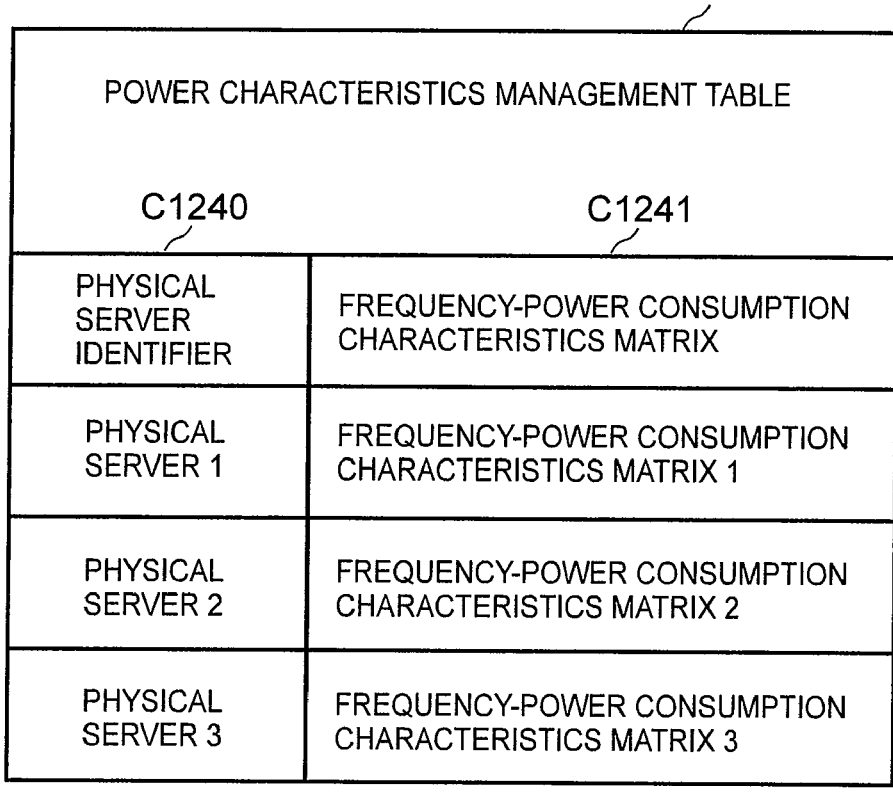
FIG. 11 is a schematic diagram showing the configuration of a power characteristics management table.

FIG. 11 is a schematic diagram showing an example of the configuration of the power characteristics management table 124. The power characteristics management table 124 manages the characteristics depicting power consumption changes relative to the drive frequency changes of the respective CPUs 21 of the physical server 20. The power characteristics management table 124 stores information for achieving the optimum frequencies at which the virtual server 220 and hypervisor 200 can be properly operated.

Column C1240 stores a physical server identifier. Column C1241 stores a frequency-power consumption characteristics matrix 125 related to the CPU 21. Normally, the same type CPU 21 is mounted in the physical server 20. The frequency-power consumption characteristics matrix 125 shows a change in the power consumption corresponding to the drive frequency of the CPU 21 that belongs to the physical server 20.

In general, a linear relationship such as $W=V \times f$ (where V is the drive voltage of the CPU) exists between the drive frequency f and the power consumption W of the CPU. Further, when the drive frequency is lowered, the drive voltage of the CPU can also be lowered, and this can result in effectively reducing power consumption.

However, in actuality, there are also instances in which a clear linear relationship is not achieved between the drive frequency and the power consumption. In cases like this, there is a frequency range whose effect on reducing power consumption is small compared to the extent to which the drive frequency is lowered.

Meanwhile, there are CPU characteristics that do not allow a sudden change in the drive frequency or drive voltage of the CPU. Therefore, it is impossible to quickly return to the original state when the load of the virtual server 220 rises and performance deteriorates.

Accordingly, in this embodiment, to reduce the cost of drive frequency changes as much as possible, a threshold is provided for a frequency that can be lowered, and the frequency is not lowered below that threshold even if it is possible to lower the frequency further. That is, in this embodiment, even if the drive frequency of the CPU 21 can be lowered to a certain frequency $f(1)$, control is exerted such that the CPU 21 drive frequency stops at the prescribed threshold frequency fth, the value of which is larger than the configurable frequency $f(1)$ when the magnitude of the power consumption reduction in the proximity of the frequency $f(1)$ is small.

Further, for example, there are also cases in which, if the CPU manufacturer and type differ, the relationship between the drive frequency and the power consumption will differ. In a case like this, it is possible to use the power characteristics management table 124 to learn the differences in the characteristics of each CPU beforehand.

Figures 12A, 12B:
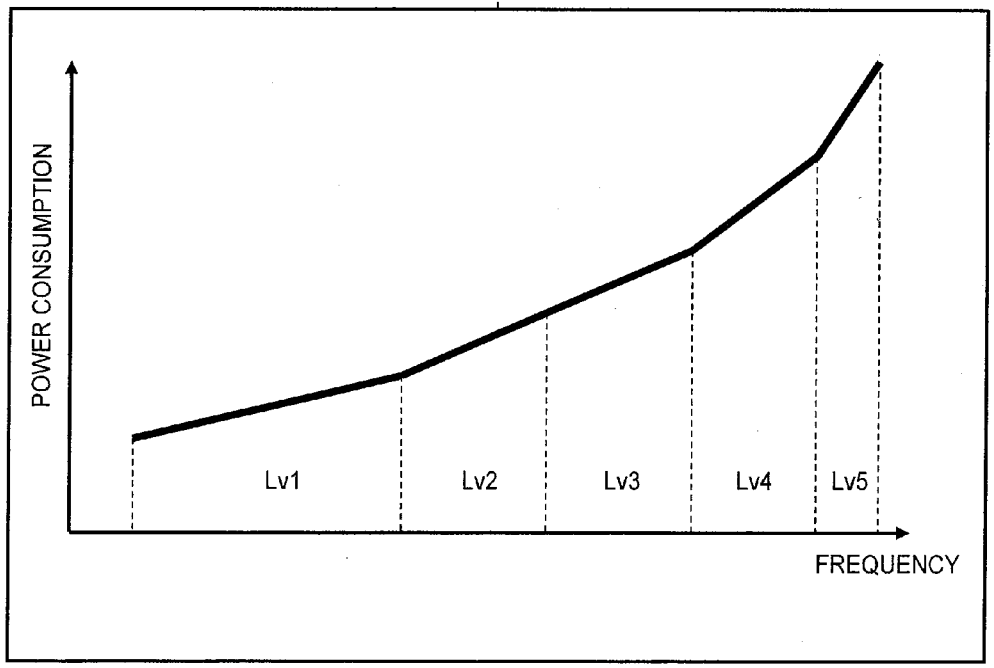
FIG. 12 (FIGS. 12A and 12B) shows schematic diagrams showing the relationships between drive frequencies and power consumption.

FIG. 12 is a schematic diagram showing an example of the configuration of the frequency-power consumption characteristics matrix 125. Column C1250 shown in FIG. 12A stores the CPU drive frequency for each frequency level. Column C1251 stores the power consumption value.

The frequency levels partition frequencies into ranges for which the magnitude of a power consumption change differs relative to the magnitude of a frequency change.

In this embodiment, when the load (CPU utilization ratio) of the virtual server 220 unexpectedly rises, it is supposed that the performance of the virtual server 220 will return to its original state relatively quickly. Thus, this embodiment comprises a function that is characteristic in that the frequency does not change by extending across a frequency level that differs from the current frequency level, even when it is possible to lower the drive frequency by a magnitude corresponding to the load state of the virtual server 220.

For example, a case in which the load on the virtual server 220 is small and the CPU drive frequency is capable of being lowered by up to one half will be considered. In this case, if the drive frequency is lowered by one half, and thereafter the load on the virtual server 220 unexpectedly increases, it will not be possible to respond quickly to the sudden increase in load. This is because, as was explained hereinabove, the CPU drive frequency and drive voltage must be changed in stages. It takes time to restore the CPU drive frequency to its original value to deal with the increased load.

Further, when the virtual server 220 load fluctuates frequently and the drive frequency changes frequently, load can be generated in line with this changing of the drive frequency. Therefore, in this embodiment, when it is estimated that the effect on power consumption reduction will be small even if the drive frequency is lowered, the drive frequency is not lowered beyond the pre-configured threshold.

As a method for configuring the drive frequency threshold, for example, the frequency-power consumption characteristics matrix 125 can be used to carry out the configuration based on the magnitude of change in power consumption relative to the magnitude of change in the drive frequency (power characteristics gradient).

For example, as shown in FIG. 12B, the drive frequencies are categorized into levels for each power consumption characteristic gradient. In FIG. 12, a total of five frequency levels is given as an example: frequency level 1 (1.6 to 2.2 GHz), frequency level 2 (2.2 to 2.4 GHz), frequency level 3 (2.4 to 2.6 GHz), frequency level 4 (2.6 to 2.8 GHz), and frequency level 5 (2.8 to 3.2 GHz). The frequency levels correspond to the "prescribed frequency ranges".

In the example shown in the figure, the magnitude of change (gradient) of the power consumption in frequency level 1 is the smallest, and the magnitude of power consumption change increases as the value of the frequency level increases. The magnitude of the power consumption change is the largest for frequency level 5.

The gradient of power consumption change is fixed in the respective frequency levels. The gradient of power consumption change will differ in adjacent frequency levels. In other words, frequency thresholds are configured at each of the respective frequency level boundaries. In the example shown in the figure, the frequency at the boundary between frequency level 1 and frequency level 2, the frequency at the boundary between frequency level 2 and frequency level 3, the frequency at the boundary between frequency level 3 and frequency level 4, and the frequency at the boundary between frequency level 4 and frequency level 5 all constitute thresholds.

In this embodiment, when a frequency that is capable of being changed belongs to a different frequency level, the drive frequency is not lowered to this value, but when the changeable frequency belongs to the same frequency level, the drive frequency is lowered. Consequently, it is possible to reserve a margin for the CPU drive frequency beforehand in order to deal with an unexpected load increase in the virtual server 220.

Furthermore, the threshold frequency belongs to both of the adjacent frequency levels. For example, the threshold of the boundary between frequency level 2 and frequency level 3 is a value that belongs to both frequency level 2 and frequency level 3. Therefore, for example, when the initial drive frequency is a value of around the midpoint of frequency level 3, the drive frequency will be lowered to the lower limit (threshold) of the same frequency level 3 if the loads on the respective virtual servers 220 are small. Thereafter, when the loads of the respective virtual servers 220 decrease further, the drive frequency is lowered to within the range of frequency level 2.

For example, a case will be considered in which even though the respective virtual servers 220 operate under high loads initially, idle states follow one after the other thereafter. In this case, the frequency level of the CPU drive frequency will probably be lowered in stages, and will ultimately be lowered to the lowest frequency, which is the lower limit of frequency level 1.

Figure 13:
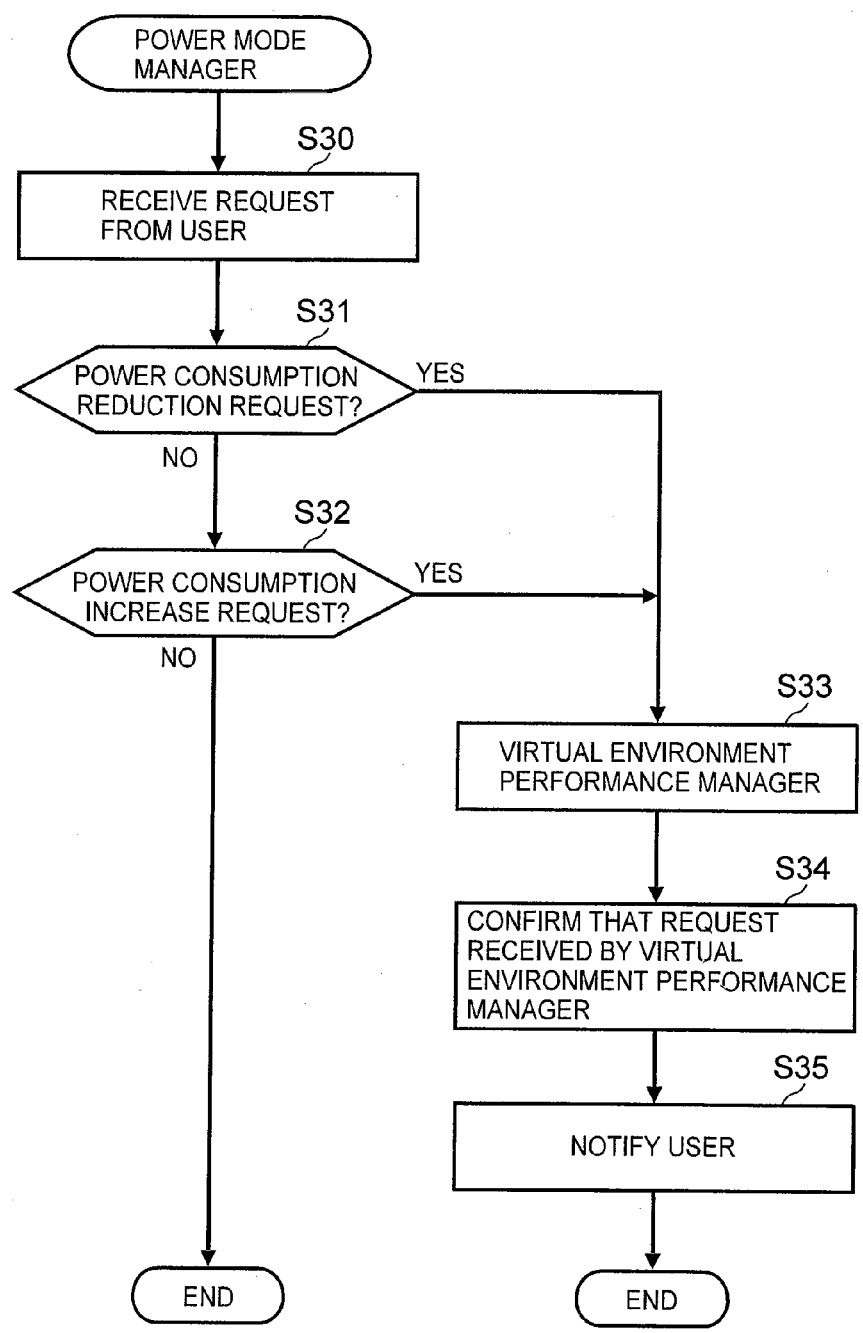
FIG. 13 is a flowchart showing a power mode management process.

FIG. 13 is a flowchart showing the power mode management process that is executed by the power mode manager 111. The respective flowcharts shown hereinbelow show overviews of the respective processes to the extent necessary to understand and implement the present invention, and may differ from the actual computer program. A so-called person having ordinary skill in the art should be able to easily change, delete or add to the steps shown in the figure.

The processing shown in FIG. 13 is initially implemented in response to a power consumption reduction request or power consumption increase request from the user. The power mode manager 111, upon receiving a request inputted from the user (S30), determines whether the request is a request to reduce the power consumption, or a request to increase the power consumption (S31, S32).

The power consumption reduction request is a request to reduce the drive frequency based on the performance measurement results of the hypervisor 200 and the respective virtual servers 220. The power consumption increase request is a request to increase the drive frequency based on the performance measurement results of the hypervisor 200 and the respective virtual servers 220.

Either when the request is to reduce the power consumption (S31: YES), or when the request is to increase the power consumption (S32: YES), control switches to the virtual environment performance manager 101 (S33). The power mode manager 111 confirms that control has been taken over by the virtual environment performance manager 101 by receiving a notification from the virtual environment performance manager 101 (S34). The power mode manager 111 sends a report to the effect that the request issued by the user has been received normally (S35).

The user issues a power consumption adjustment request (either a power consumption reduction request or increase request) one time, and thereafter, the management server 10 can regularly execute power consumption adjustments. That is, the management server 10 either regularly or irregularly monitors the load states of the respective virtual servers 220 and the hypervisor 200, and can automatically execute feedback control that either increases or reduces the drive frequency of the CPU 21 in accordance with these load states.

Figure 14:
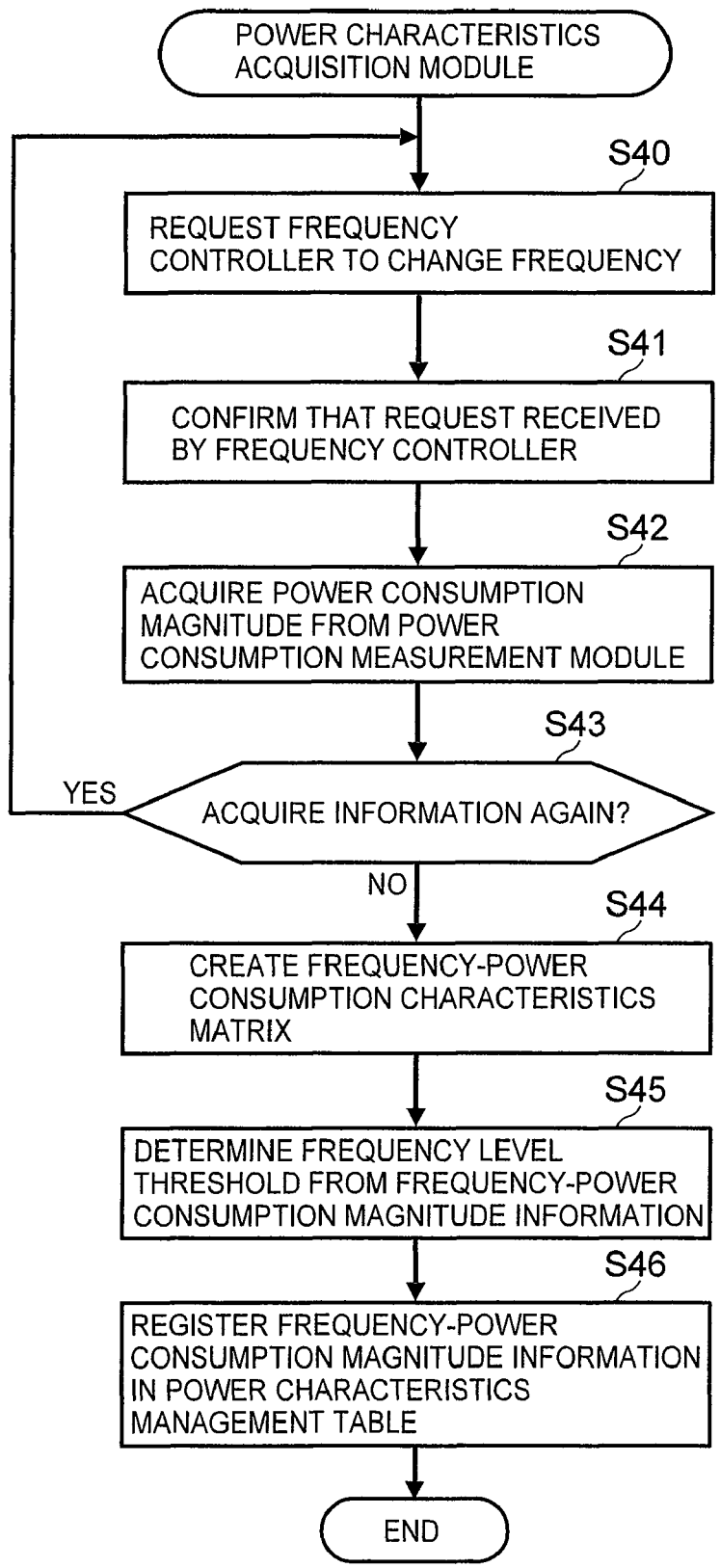
FIG. 14 is a flowchart showing a power characteristics acquisition process.

FIG. 14 is a flowchart showing the power characteristics acquisition process, which is executed by the power characteristics acquisition module 112. This process is implemented for acquiring information related to the frequency-power consumption characteristics beforehand prior to a power consumption adjustment being requested by the user. The acquired information on frequency-power consumption characteristics is used to select the optimum drive frequency. The optimum drive frequency, for example, is the drive frequency, which is capable of dealing with a future load increase, and which is capable of effectively reducing the power consumption.

The present invention does not necessarily require information related to frequency-power consumption characteristics. The present invention is able to reduce the power consumption of the physical server 20 while curbing drops in performance in the virtual server 220 and the hypervisor 200 even when information related to the frequency-power consumption characteristics is not used. However, using information related to the frequency-power consumption characteristics makes it possible to select an appropriate drive frequency, and to more effectively control the power consumption of the physical server 20.

First of all, the power characteristics acquisition module 112 requests the frequency controller 214 inside the hypervisor 200 to change the drive frequency to achieve power consumption in the physical server 20 for a specified drive frequency (S40). The parameters of the request, for example, include the physical server identifier, the drive frequency value and so forth.

The power characteristics acquisition module 112 confirms that the request issued in S40 has been received by the frequency controller 214 in accordance with a notification received from the frequency controller 214 (S41). The power characteristics acquisition module 112 acquires the power consumption of the physical server 20 from the power consumption measurement module 26 (S42).

The power consumption measurement module 26, for example, uses a current sensor mounted to the motherboard of the physical server 20 to measure power consumption. The measured power consumption comprises the power consumed by the respective CPUs 21 and memories 22, and the power consumed by the other electronic circuits, such as, for example, the cooling fan and interface circuits. However, the CPU 21 is the main consumer of the power.

The power characteristics acquisition module 112 determines whether or not to acquire additional information (S43). That is, the power characteristics acquisition module 112 determines whether or not all the information needed to create the frequency-power consumption characteristics matrix 125 has been obtained (S43), and when it is determined that further information needs to be acquired (S43: YES), returns to S40. Then, Steps S40 to S42 are repeated once again.

The power characteristics acquisition module 112, for example, splits the drive frequency of the normal mode CPU 21 per for which frequency adjustment is not being carried out into 100 stages from the lowest frequency to the highest frequency, and acquires the power consumption corresponding to the frequency of each stage. Furthermore, the number of acquisitions is not limited to 100. The number of acquisitions can be less than 100 or more than 100. Further, the configuration can be such that the number of acquisitions changes in accordance with the type of CPU. Furthermore, the configuration can be such that the user can configure arbitrary values for the width of the frequency to be measured and the number of acquisitions.

When the information required to create the frequency-power consumption characteristics matrix 125 is capable of being acquired (S43: NO), the power characteristics acquisition module 112 classifies the magnitude of the power consumption change for each drive frequency, and creates the frequency-power consumption characteristics matrix 125 (S44).

The power characteristics acquisition module 112 classifies the degree of power consumption change relative to the drive frequency into a plurality of stages based on the frequency-power consumption characteristics matrix 125 created in S44, and obtains the frequency levels. The power characteristics acquisition module 112 determines the lowest frequency inside the respective frequency levels as the threshold frequency for each frequency level (S45).

The power characteristics acquisition module 112 registers the information related to the frequency-power consumption characteristics and the frequency-power consumption characteristics matrix 125 in the power characteristics management table 124 (S46).

Consequently, even when physical servers 20 having respectively different frequency-power consumption characteristics coexist inside an information processing system, it is possible to control the power consumption in accordance with the frequency-power consumption characteristics of the respective physical servers 20.

For example, the absolute value and characteristics of power consumption will change greatly depending on differences in the structure of the CPUs 21 and the number of processor cores. Even in a case like this, preparing a frequency-power consumption characteristics matrix 125 for each physical server 20 makes it possible to determine an effective frequency in accordance with the characteristics of the physical server 20 targeted for power consumption control.

Furthermore, the collection of information related to frequency-power consumption characteristics and the creation of the frequency-power consumption characteristics matrix 125 can be executed a plurality of times while the physical server 20 is operating. For example, when power consumption differs according to the continuous operating time of the physical server 20, it is possible to obtain a more accurate frequency-power consumption characteristics matrix 125 by acquiring the information related to frequency-power consumption characteristics at prescribed intervals. Further, a drop in physical server 20 performance can be curbed by collecting information related to frequency-power consumption characteristics at time periods that are smaller than the prescribed values at which physical server 20 loads are preconfigured.

Figure 15:
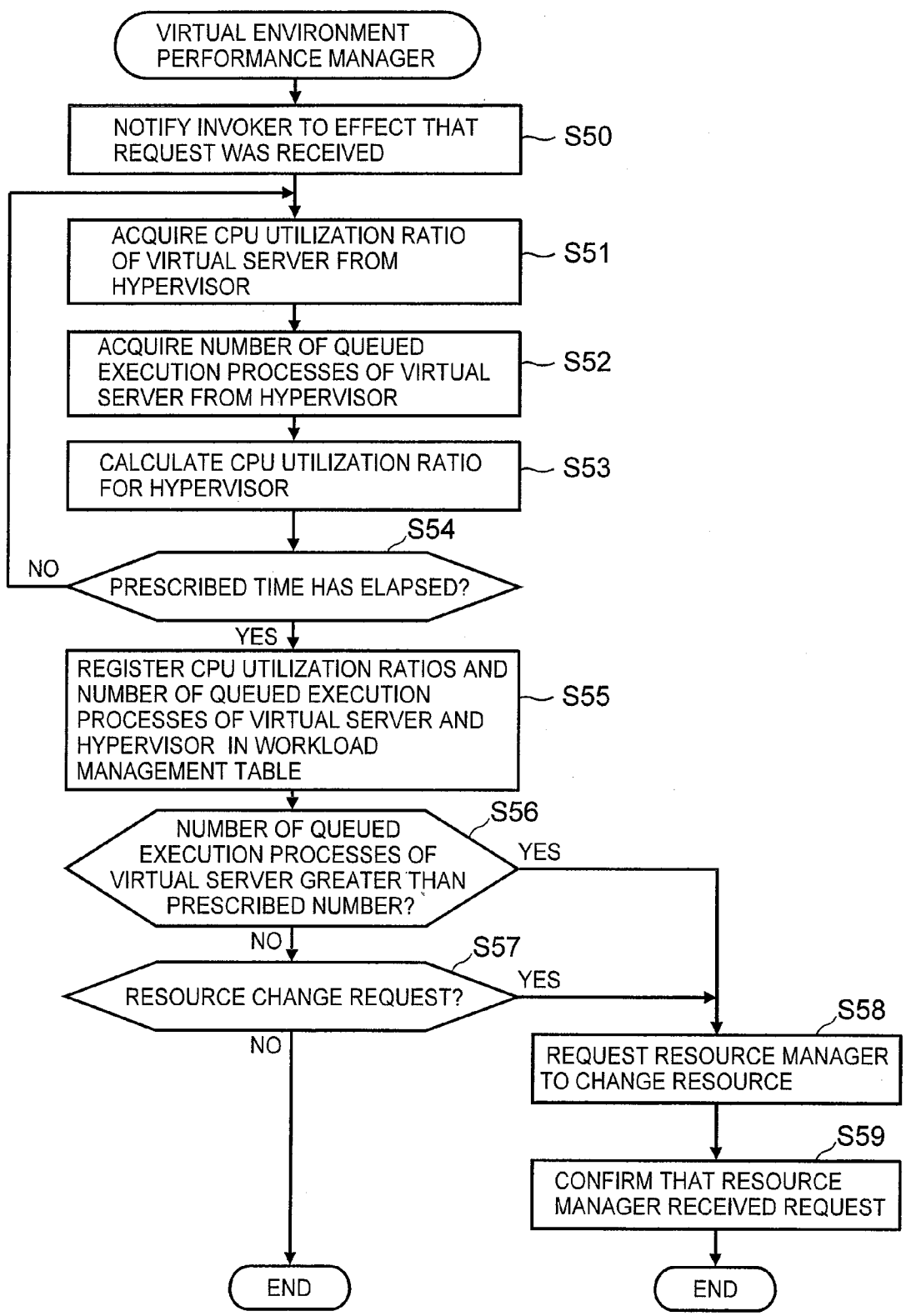
FIG. 15 is a flowchart showing a virtual environment performance management process.

FIG. 15 is a flowchart showing the virtual environment performance management process executed by the virtual environment performance manager 101. The process, for example, is executed by being invoked from the power mode manager 111. In this process, the load states of the respective virtual servers 220 and the hypervisor 200 are collected, and registered in the workload management table 123.

The virtual environment performance manager 101 notifies the invoker to the effect that the request has been received (S50). The invoker can include the power mode manager 111 (S33 of FIG. 13). For convenience of explanation, the virtual environment performance manager 101 may be called the "performance manager 101" hereinbelow.

The performance manager 101 acquires the physical CPU utilization ratios of the respective virtual servers 220 from the hypervisor 200 (S51). Furthermore, the physical CPU utilization ratio can become larger in accordance with the contents of the task that the virtual server 220 is to process, regardless of the performance of the CPU 21 and the drive frequency. In this case, the number of task requests to the hypervisor 200 can be used instead of the physical CPU utilization ratio.

The performance manager 101 acquires the number of queued execution processes of the respective virtual servers 220 from the hypervisor 200 (S52). The number of queued execution processes of the virtual server 220 is the number of processing commands (number of tasks), of the processing commands that the respective virtual servers 220 issue to the hypervisor 200, that are in the queued execution processing state in the hypervisor 200.

As a method for acquiring the number of queued execution processes of the virtual server 220, for example, a method, by which the hypervisor 200 monitors and counts for each unit of time the processing commands issued to the hypervisor 200 from the virtual server 220 per unit of time, will be considered.

The performance manager 101 calculates the physical CPU utilization ratio of the hypervisor 200 based on the number of queued execution processes acquired in Step S52 (S53).

When a state in which the number of queued execution processes of the virtual server 220 exceeds a prescribed number continues, the performance manager 101 can determine if the load of the virtual server 220 is increasing. Consequently, it is possible to detect the overhead of the hypervisor 200, and the real load state of the virtual server 220.

The performance manager 101 repeatedly executes Steps S51 to S53 for a prescribed period of time in order to remove affects due to temporary load fluctuations and acquire an average value (S54).

The performance manager 101 registers the average value of the information collected over the prescribed period of time (the physical CPU utilization ratio of the virtual server 220, the number of queued execution processes of the virtual server 220, and the physical CPU utilization ratio of the hypervisor 200) in the workload management table 123 (S55).

When either the number of queued execution processes of the virtual server 220 is greater than a prescribed number (S56: YES), or a resource change request for forcibly changing a resource allocation is inputted (S57: YES), the performance manager 101 issues a resource change request to the resource manager 102 (S58). For example, when a power consumption adjustment request is inputted manually by the user to the management server 10, a determination of "YES" is made in Step S57.

The resource change request issued to the resource manager 102, for example, comprises the total value of the CPU utilization ratio of the virtual server 220 and the CPU utilization ratio of the hypervisor, and the number of queued execution processes of the virtual server 220 as parameters.

The performance manager 101 confirms that the resource manager 102 has received the request issued in Step S58 by receiving a notification to that effect from the resource manager 102 (S59).

Furthermore, in Step S56, a determination is made as to whether or not to change the resource allocation based on the number of queued execution processes of the virtual server 220. The resource allocation change, that is, the drive frequency change signifies a change in the CPU allocation budget under the changed drive frequency.

When, subsequent to reducing the power consumption by lowering the CPU drive frequency, the load of the virtual server 220 skyrockets, making it necessary to return from the power-saving mode to the normal mode, power consumption can be further reduced after the drive frequency is lowered.

Accordingly, configuring a lower limit and an upper limit beforehand as the thresholds of the number of queued execution processes of the virtual server 220 will be considered. For example, when the number of queued execution processes is equivalent to the (number of virtual servers 220)×2, the lower limit is treated as the threshold, and when the number of queued execution processes is equivalent to the (number of virtual servers 220)×3, the upper limit is treated as the threshold.

When the value measured by the virtual environment performance manager 101 is smaller than the upper limit, a determination is made that it is a state in which a resource change is possible, and when the measured value falls below the lower limit, a resource change is carried out forcibly. Consequently, it is possible to prevent the frequent issuing of resource change requests in response to temporary rises in the load of the virtual server 220. Therefore, it is possible to prevent the CPU 21 drive frequency from being changed more than necessary, and to lower the change cost.

Figure 16:
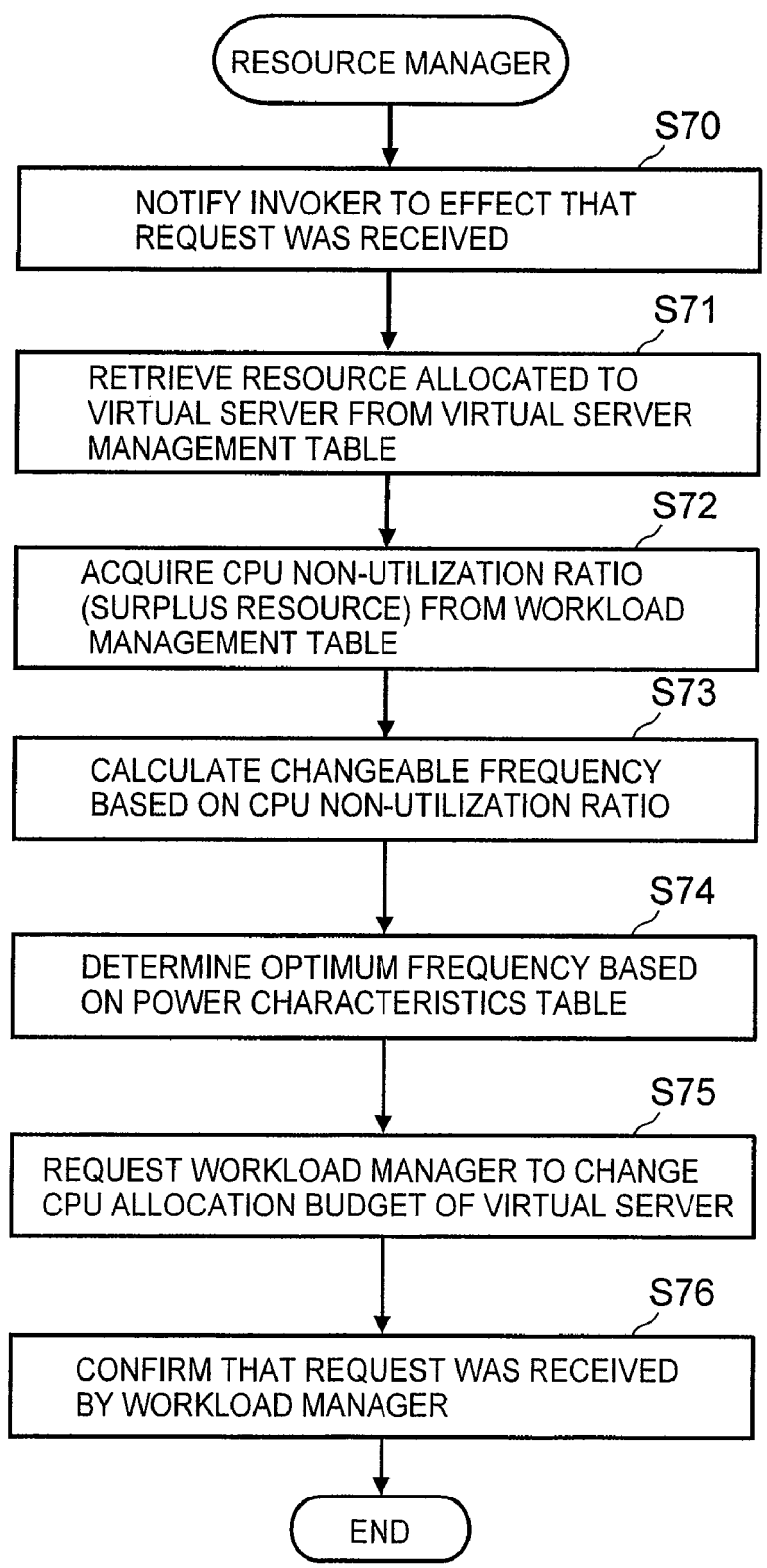
FIG. 16 is a flowchart showing a resource management process.

FIG. 16 is a flowchart showing the resource management process executed by the resource manager 102. This process is invoked and executed when the drive frequency of the CPU 21 is either increased or decreased, and when a CPU allocation budget change is carried out for the respective virtual servers 220 and the hypervisor 200.

The resource manager 102 notifies the virtual environment performance manager 101, which is the invoker, to the effect that the request has been received (S70). The resource manager 102 retrieves the virtual server management table 122, and discerns the resources allocated to the virtual server 220 (S71).

The resource manager 102 uses the workload management table 123 to calculate the non-utilization ratio of the CPU based on the allocation resource information of the virtual server 220 (CPU allocation budget, CPU utilization ratio) (S72). The CPU non-utilization ratio is the difference between the entire budget of the CPU of the physical server 20 and the CPU utilization budget.

As a method for calculating the CPU non-utilization ratio, for example, there is a method by which the CPU non-utilization ratio is determined as the value achieved by subtracting the CPU utilization ratio, which is the total of the CPU utilization ratio of the respective virtual servers 220 that utilize the CPU group 21G and the CPU utilization ratio of the hypervisor 200, from 100%.

The resource manager 102 calculates the frequency that can be changed to reduce the power consumption based on the calculated CPU non-utilization ratio (S73).

As a method for calculating the changeable frequency based on the CPU non-utilization ratio, for example, a method that multiplies the CPU non-utilization ratio by the drive frequency of the CPU (CPU group 21G) prior to the frequency change will be considered. For example, think of a case in which the pre-frequency change CPU drive frequency of the physical server 20 is 3 GHz (100% full operation), and the CPU non-utilization ratio is 30%. In this case, the changeable frequency can be calculated as 3 GHz×(100−30) %=2.1 GHz (70% of full operation).

The resource manager 102 determines the optimum drive frequency by using the power characteristics management table 124 (S74).

For example, the resource manager 102 detects the frequency level that comprises the frequency calculated in Step S73 by searching the frequency-power consumption characteristics matrix 125 for the frequency calculated in Step S73. The resource manager 102, for example, can select as the optimum frequency the upper-limit frequency inside the detected frequency level (S74).

For example, consider a case in which the changeable frequency calculated in Step S74 is 2.1 GHz, and this frequency belongs to frequency level 1. The pre-change drive frequency is 3 GHz. In this case, as shown in FIG. 12, the power consumption reduction effect is small in frequency level 1. Therefore, it is decided that 2.2 GHz, which is the upper limit of frequency level 1 (the threshold frequency between frequency level 1 and frequency level 2), becomes the optimum frequency. Therefore, in the case of this example, a margin of 0.1 GHz is generated between the changeable frequency (2.1 GHz) and the determined frequency (2.2 GHz).

Thus, the resource manager 102 cannot change the frequency beyond the threshold when the magnitude of the frequency change is either greater than or less than the threshold. Consequently, when the power reduction effect is small despite lowering the drive frequency of the CPU 21, it is possible to reduce the cost needed to change the drive frequency.

As described hereinabove, configuring beforehand the range within which the drive frequency is capable of being changed makes it possible to hold the magnitude of the drive frequency change within the prescribed range, and to prevent a sudden change in the drive frequency. Therefore, CPU 21 malfunctions can be prevented in advance, and the drive frequency can be rapidly increased to deal with an increase in the load of the virtual server 220.

The resource manager 102 requests the workload manager 103 to change the CPU allocation budget (S75). The optimum frequency determined in Step S74 comprises the parameter of this request to change the CPU allocation budget. The resource manager 102 confirms that the workload manager 103 has received the CPU allocation budget change request by receiving a notification from the workload manager 103 (S76).

Figure 17:
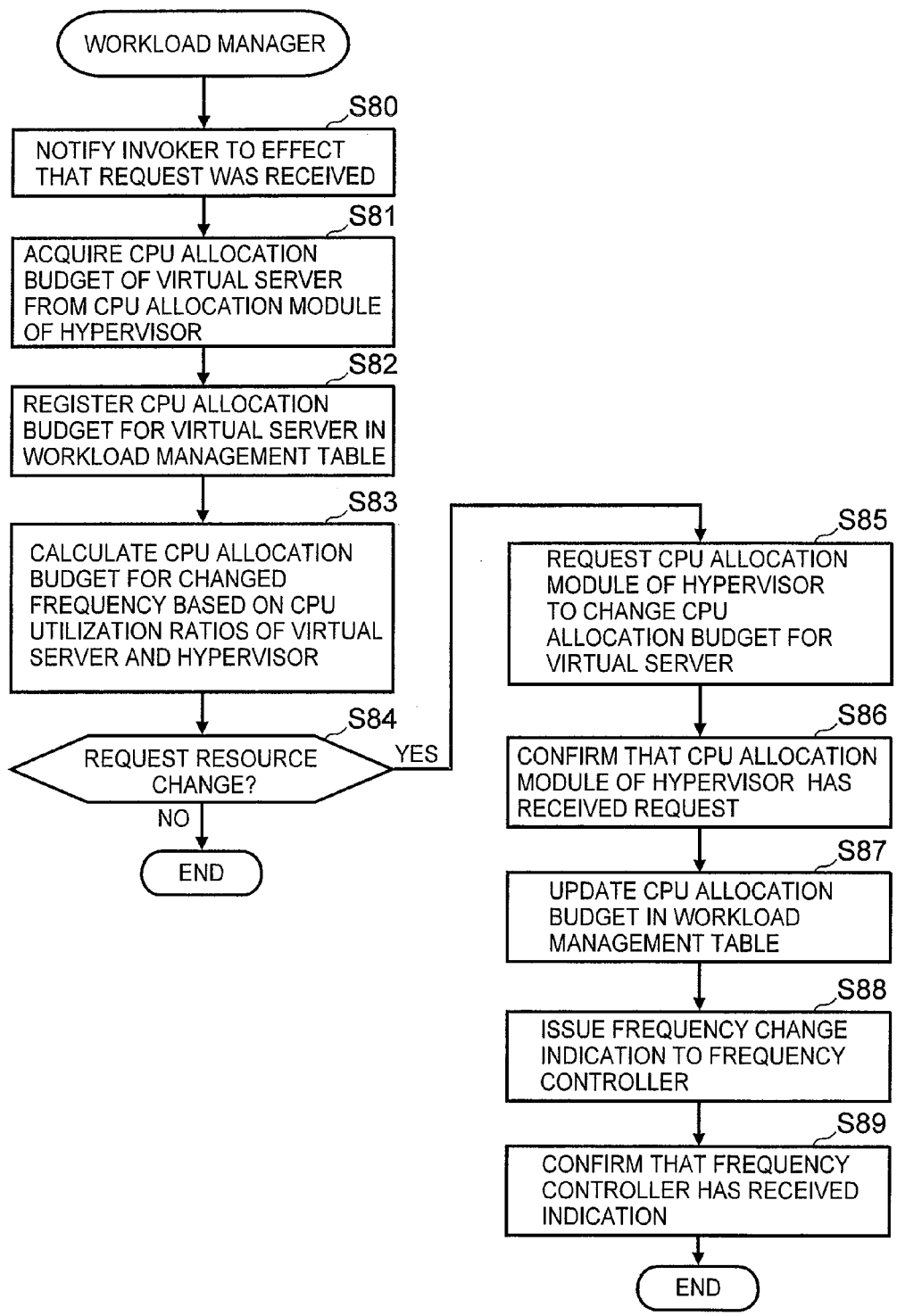
FIG. 17 is a flowchart showing a workload management process.

FIG. 17 is a flowchart showing the workload management process executed by the workload manager 103. This process is invoked and executed when the CPU allocation module 211 is requested to change the CPU allocation budget.

The workload manager 103 notifies the resource manager 102, which is the invoker, to the effect that the request has been received (S80). Next, the workload manager 103 acquires the CPU allocation budget of the respective virtual servers 220 and the hypervisor 200 from the CPU allocation module 211 of the hypervisor 200 (S81).

The workload manager 103 registers the CPU allocation budget of the respective virtual servers 220 in the workload management table 123 (S82). The workload manager 103 calculates a new CPU allocation budget for subsequent to the drive frequency change based on the CPU allocation budgets of the respective virtual servers 220 and the hypervisor 200, and the CPU utilization ratios of the respective virtual servers 220 and the CPU utilization ratio of the hypervisor 200 (S83).

The workload manager 103 calculates a new CPU allocation budget such that the processing performance of the respective virtual servers 220 and the hypervisor 200 are not lowered even when the drive frequency of the CPU 21 is changed to the optimum frequency.

As a method for calculating the CPU allocation budget, for example, a method that multiplies the magnitude of the drive frequency change by the CPU utilization ratio of the virtual server 220 prior to the drive frequency being changed will be considered.

For example, think of a case in which the CPU utilization ratio of the pre-frequency change virtual server 220 is 60%, and the CPU drive frequency is lowered from the highest frequency (100% (3 GHz)) to a value that is 74% of the highest frequency (3×0.74=2.2 GHz). In this case, the CPU allocation budget of the post-frequency change virtual server 220 is calculated as 60%×(100%÷74%)=81%. Then, the CPU allocation budgets of the respective virtual servers 220 and the hypervisor 200 are determined such that the total value of the CPU utilization ratios of the respective virtual servers 220 and the CPU utilization ratio of the hypervisor 200 is either 100% or a value approximating 100%.

The workload manager 103 determines whether or not to change the resource allocation (S84), and when the determination is to change this allocation (S84: YES), requests the CPU allocation module 211 of the hypervisor 200 to change the CPU allocation budget for the hypervisor 200 and the respective virtual servers 220 (S85). This request to change the CPU allocation budget comprises the CPU allocation budget calculated in Step S83 as the parameter.

The workload manager 103 confirms that the request issued in Step S85 has been received by the CPU allocation module 211 by receiving a notification from the CPU allocation module 211 (S86). Then, the workload manager 103 updates the CPU allocation budgets of the respective virtual servers 220 in the workload management table 123 (S87).

The workload manager 103 requests the frequency controller 214 to change the frequency (S88). This frequency change request comprises the optimum frequency and the CPU group identifier as parameters. Further, it is confirmed whether the frequency controller 214 has received the parameters (S89).

Furthermore, as methods for calculating the CPU allocation budget, the method that calculates the CPU allocation budget based on the CPU utilization ratio of the virtual server 220 can be used, or a method that calculates the CPU allocation budget so as to satisfy a lowest value configured beforehand by the user can also be used. By specifying beforehand the lowest value, which should be the lower limit of the virtual server 220, it is possible to increase the extent to which the CPU drive frequency can be lowered, and to reduce the power consumption even more.

FIG. 18 is a flowchart showing the frequency control process executed by the frequency controller 214.

The frequency controller 214 notifies the workload manager 103, which is the invoker, to the effect that the request has been received (S100). The frequency controller 214 issues an indication to the frequency change-targeted CPU 21 to change the frequency (S101). The frequency change request to the CPU 21, for example, can specify the frequency value, or, when the frequency is partitioned into a plurality of levels, the change request can specify the level number.

Furthermore, when the CPU 21 lowers the drive frequency, the CPU 21 can lower the drive voltage as well. Lowering the drive voltage as well as the drive frequency makes it possible to increase the power consumption reduction effect.

The frequency controller 214 notifies the virtual environment performance manager 101 to the effect that the frequency change has ended (S102). Furthermore, the frequency controller 214 requests the virtual environment performance manager 101 to measure the load states of the post-frequency change respective virtual servers 220 and hypervisor 200 (S102).

In accordance with configuring this embodiment like this, it is possible to appropriately control the power consumption of the physical server 20 that has the respective virtual servers 220 and the hypervisor 200, while curbing the deterioration of processing performance in the respective virtual servers 220.

In this embodiment, the drive frequency of the CPU 21 is not lowered to the lowest possible frequency, but rather the frequency (threshold frequency) when the value of the gradient showing the change in power consumption magnitude is used to restrict the range determined for the CPU 21 drive frequency. Therefore, in this embodiment, it is possible to decide a CPU 21 drive frequency within a prescribed frequency range, and to deal rapidly with an increase in the load on the virtual server 220.

Embodiment 2

FIG. 19 is a flowchart showing the power mode management process executed by a management server 10 related to a second embodiment of the present invention. This embodiment corresponds to a variation of the first embodiment, and as such, will be explained by focusing on the points of difference with the first embodiment.

A power mode manager 111, upon receiving a power consumption control schedule 500 (S30A), executes the steps S31 to S35 described using FIG. 13. The power consumption control schedule 500, for example, comprises information related to the times at which the respective virtual servers 220 operate.

Therefore, the power mode manager 111 can carry out a drive frequency change and a CPU allocation budget change that coincide with the operating times of the respective virtual servers 220 by operating in accordance with the power consumption control schedule 500.

For example, if the times at which the respective virtual servers 220 operate and the peak load times of the respective virtual servers 220 are recorded in the schedule 500, it is possible to prevent the respective virtual servers 220 from operating simultaneously, and to balance the loads of the respective virtual servers 220. Consequently, it is possible to keep the CPU 21 drive frequency at a low value for a relatively long time, thereby enabling power consumption to be further reduced.

Furthermore, the present invention is not limited to the above-described embodiments. A person having ordinary skill in the art can make a variety of additions and changes without departing from the scope of the present invention.

What is claimed is:

1. A server power consumption controller for controlling power consumption of a physical server having at least one virtual server, where the physical server comprises the at least one virtual server virtually created by allocating a portion of a total budget of a processing resource of the physical server, and a hypervisor that creates the at least one virtual server by allocating the portion of the total budget of the processing resource to the at least one virtual server, the server power consumption controller comprising:
a utilization budget detector that detects a total utilization budget including a first budget of the processing resource utilized by the at least one virtual server and a second budget of the processing resource utilized by the hypervisor, and outputs a determination request for a frequency for driving the processing resource;
a frequency determination module that determines, when the determination request is received, the frequency for driving the processing resource based on a difference between the total utilization budget and the total budget of the processing resource;
an allocation budget determination module that respectively determines, in accordance with the determined frequency, a third budget of the processing resource to be allocated to the at least one virtual server, and a fourth budget of the processing resource to be allocated to the hypervisor; and
a configuration change module that requests the hypervisor to allocate the determined third budget of the processing resource to the at least one virtual server, to allocate the determined fourth budget of the processing resource to the hypervisor, and to drive the processing resource at the determined frequency.

2. The server power consumption controller according to claim 1, further comprising a power consumption characteristics acquisition module that acquires beforehand frequency-power consumption characteristics showing a relationship between the frequency and power consumption related to the processing resource,
wherein the frequency determination module determines the frequency for driving the processing resource from within a range of prescribed frequencies configured beforehand on the basis of the frequency-power consumption characteristics.

3. The server power consumption controller according to claim 2, wherein the prescribed frequency range is configured in accordance with a value of a gradient of a characteristic line that shows the power consumption change according to the frequency change.

4. The server power consumption controller according to claim 3, wherein thresholds are respectively pre-configured to frequencies at which the values of the gradient of the characteristic line change, and a range of frequencies between the respective thresholds is used as the prescribed frequency range.

5. The server power consumption controller according to claim 1, wherein the utilization budget detector monitors the number of processing requests, from among the processing requests issued from the at least one virtual server, which are placed in an execution queue in the hypervisor, and when the number of the processing requests in the execution queue has reached a pre-configured upper limit, requests the frequency determination module to increment the frequency for driving the processing resource.

6. The server power consumption controller according to claim 1, wherein the third budget is determined as a minimum required processing resource budget for the at least one virtual server under the determined frequency, and the fourth budget is determined as a minimum required processing resource budget for the hypervisor under the determined frequency.

7. The server power consumption controller according to claim 1, wherein the fourth budget is allocated to the hypervisor prior to the third budget allocated to the at least one virtual server.

8. The server power consumption controller according to claim 1, wherein the utilization budget detector operates in accordance with a prescribed indication.

9. The server power consumption controller according to claim 8, wherein the prescribed indication is inputted by a user.

10. The server power consumption controller according to claim 9, wherein a lowest value for the third budget is specified beforehand in the prescribed indication.

11. The server power consumption controller according to claim 9, wherein a schedule that shows a time at which the at least one virtual server will execute a process is included beforehand in the prescribed indication, and the utilization budget detector outputs the determination request based on the schedule.

12. The server power consumption controller according to claim 1, wherein the utilization budget detector outputs the determination request when the at least one virtual server and a plurality of other virtual servers are sharing the processing resource of the physical server.

13. The server power consumption controller according to claim 1, wherein the configuration change module, prior to driving the processing resource at the frequency determined by the frequency determination module, requests the hypervisor to allocate the determined third budget of the processing resource to the at least one virtual server, and to allocate the determined fourth budget of the processing resource to the hypervisor, and to subsequently drive the processing resource at the determined frequency.

14. The server power consumption controller according to claim 2, wherein the hypervisor comprises:
a processing resource allocation function for allocating the determined third budget of the processing resource to the at least one virtual server, and also allocating the determined fourth budget to the hypervisor in accordance with a request from the configuration change module;

a frequency control function for changing the frequency for driving the processing resource; and a power consumption measurement function for acquiring basic data for creating the frequency-power consumption characteristics by using the frequency control function.

15. A power consumption control method for controlling power consumption of a physical server having at least one virtual server, where the physical server includes the at least one virtual server virtually created by allocating a portion of a total budget of a processing resource of the physical server, and a hypervisor that creates the at least one virtual server by allocating the portion of the total budget of the processing resource to the at least one virtual server, the server power consumption control method comprising the steps of:

detecting a total utilization budget including a first budget of the processing resource utilized by the at least one virtual server and a second budget of the processing resource utilized by the hypervisor, and outputting a determination request for a frequency for driving the processing resource;

determining, when the determination request is received, a frequency for driving the processing resource based on a difference between the total utilization budget and the total budget of the processing resource;

respectively determining, in accordance with the determined frequency, a third budget of the processing resource to be allocated to the at least one virtual server, and a fourth budget of the processing resource to be allocated to the hypervisor;

requesting the hypervisor to allocate the determined third budget of the processing resource to the at least one virtual server, and to allocate the determined fourth budget of the processing resource to the hypervisor; and requesting the hypervisor to drive the processing resource at the determined frequency.

16. A power consumption control method for controlling power consumption of a physical server having at least one virtual server, where the physical server includes the at least one virtual server virtually created by allocating a portion of a total budget of a processing resource of the physical server, and a hypervisor that creates the at least one virtual server by allocating the portion of the total budget of processing resource to the at least one virtual server, the server power consumption control method comprising the steps of:

acquiring frequency-power consumption characteristics that show a relationship between a frequency and power consumption related to the processing resource;

detecting a total utilization budget including a first budget of the processing resource utilized by the at least one virtual server and a second budget of the processing resource utilized by the hypervisor, and outputting a determination request for a frequency for driving the processing resource;

determining, when the determination request is received, a frequency for driving the processing resource based on a difference between the total utilization budget and the total budget of the processing resource within a prescribed frequency range pre-determined based on the frequency-power consumption characteristics;

respectively determining, in accordance with the determined frequency, a third budget of the processing resource to be allocated to the at least one virtual server, and a fourth budget of the processing resource to be allocated to the hypervisor;

requesting the hypervisor to allocate the determined third budget of the processing resource to the at least one virtual server, and to allocate the determined fourth budget of the processing resource to the hypervisor; and requesting the hypervisor to drive the processing resource at the determined frequency.

17. A non-transitory computer readable medium with an executable program stored thereon, wherein the executable program causes a computer to function as a power consumption controller for controlling power consumption of a physical server having at least one virtual server, where the physical server includes the at least one virtual server virtually created by allocating a portion of a total budget of a processing resource of the physical server, and a hypervisor that creates the at least one virtual server by allocating the portion of total budget of processing resource to the at least one virtual server, the executable program respectively executing the steps of:

detecting a total utilization budget including a first budget of the processing resource utilized by the at least one virtual server and a second budget of the processing resource utilized by the hypervisor, and outputting a determination request for a frequency for driving the processing resource;

determining, when the determination request is received, a frequency for driving the processing resource based on a difference between the total utilization budget and the total budget of the processing resource;

respectively determining, in accordance with the determined frequency, a third budget of the processing resource to be allocated to the at least one virtual server, and a fourth budget of the processing resource to be allocated to the hypervisor;

requesting the hypervisor to allocate the determined third budget of the processing resource to the at least one virtual server, and to allocate the determined fourth budget of the processing resource to the hypervisor; and requesting the hypervisor to drive the processing resource at the determined frequency.

* * * * *